United States Patent
Wojcieszak et al.

(10) Patent No.: US 10,616,743 B2
(45) Date of Patent: Apr. 7, 2020

(54) LOW-LATENCY AUDIO STREAMING WITH COMMUNICATION COEXISTENCE

(71) Applicant: QUALCOMM Incorporated, San Diego, CA (US)

(72) Inventors: Laurent Wojcieszak, Belfast (GB); Richard Turner, Belfast (GB); Eric Tsou, Palo Alto, CA (US); Nachiket Shankar Deshpande, Milpitas, CA (US); Olaf Josef Hirsch, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/360,925

(22) Filed: Mar. 21, 2019

(65) Prior Publication Data

US 2019/0387382 A1    Dec. 19, 2019

Related U.S. Application Data

(60) Provisional application No. 62/686,646, filed on Jun. 18, 2018.

(51) Int. Cl.
| | |
|---|---|
| *H04W 4/80* | (2018.01) |
| *H04W 84/18* | (2009.01) |
| *H04W 28/10* | (2009.01) |
| *H04W 28/02* | (2009.01) |

(52) U.S. Cl.
CPC ......... *H04W 4/80* (2018.02); *H04W 28/0231* (2013.01); *H04W 28/10* (2013.01); *H04W 84/18* (2013.01)

(58) Field of Classification Search
CPC .... H04L 1/0083; H04W 4/80; H04W 72/1215
See application file for complete search history.

(56) References Cited

U.S. PATENT DOCUMENTS

| | | | |
|---|---|---|---|
| 2008/0291863 A1* | 11/2008 | Agren | H04J 3/0632 370/315 |
| 2014/0348327 A1 | 11/2014 | Linde et al. | |
| 2015/0163752 A1* | 6/2015 | Appleton | H04W 52/243 370/252 |
| 2015/0289283 A1 | 10/2015 | Ko et al. | |
| 2017/0026907 A1* | 1/2017 | Min | H04W 52/0229 |

OTHER PUBLICATIONS

International Search Report and Written Opinion—PCT/US2019/032028—ISA/EPO—dated Jul. 3, 2019.

\* cited by examiner

*Primary Examiner* — David Bilodeau
(74) *Attorney, Agent, or Firm* — Arent Fox, LLP

(57) ABSTRACT

A first device may establish, with a second device, a short-range wireless communications link. The first device may determine a time interval between each of a set of packets to be transmitted over a short-range wireless communications link with a second device. The first device may encode data with a bitrate that is based on the time interval. The first device may packetize the encoded data in the set of packets. The first device may transmit the set of packets to the second device or the short-range wireless communications link, and each of the set of packets may be separated by the time interval when transmitted.

34 Claims, 14 Drawing Sheets

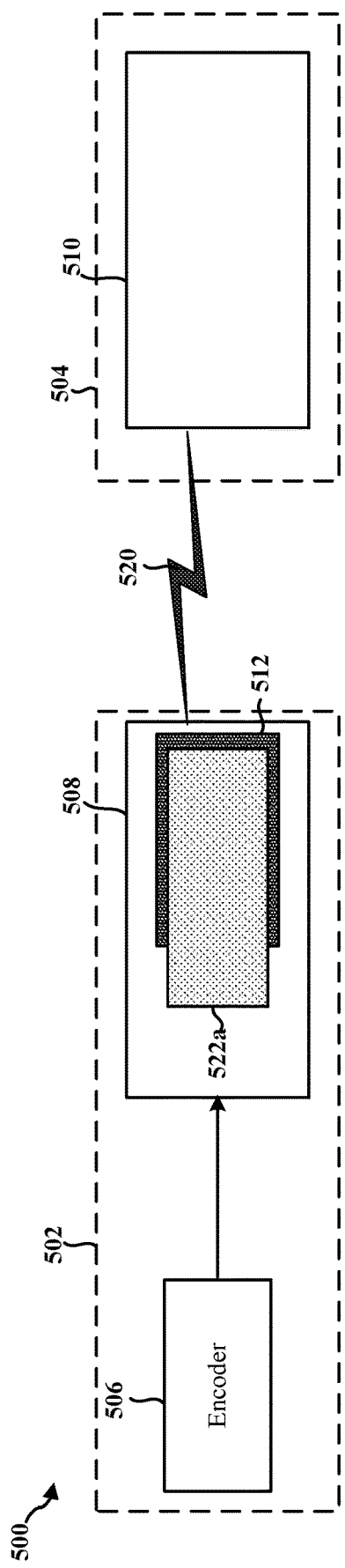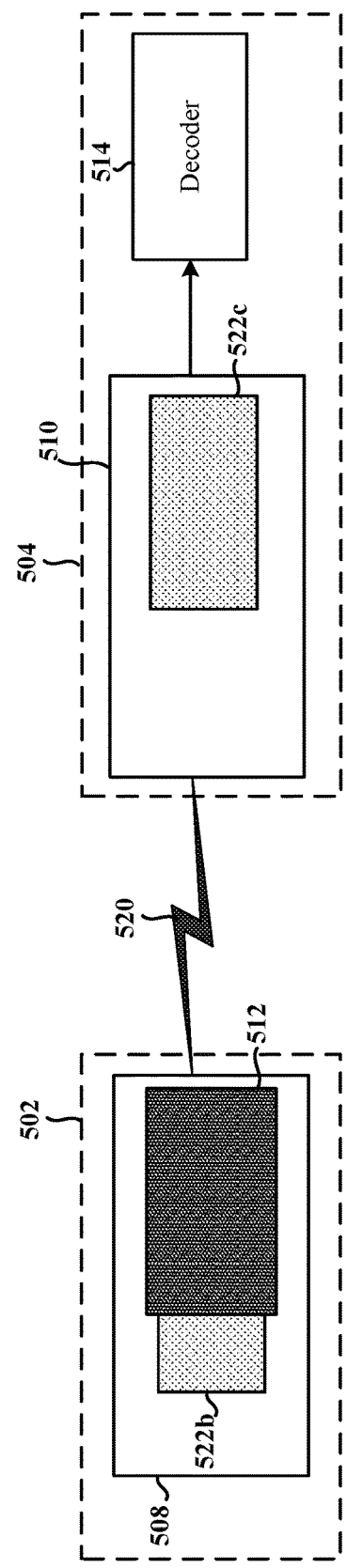

LOW-LATENCY AUDIO STREAMING WITH COMMUNICATION COEXISTENCE

CROSS REFERENCE TO RELATED APPLICATION(S)

This application claims the benefit of U.S. Provisional Application Ser. No. 62/686,646, entitled "PRESCHEDULING OF A COEXISTENCE SCHEME FOR LOW LATENCY AUDIO STREAMING" and filed on Jun. 18, 2018 which is expressly incorporated by reference herein in its entirety.

BACKGROUND

Field

The present disclosure relates generally to communication systems, and more particularly, to communicating packets over a short-range wireless communications link.

Background

A wireless personal area network (WPAN) is a personal, short-range wireless network for interconnecting devices centered around a specific distance from a user. WPANs have gained popularity because of the flexibility and convenience in connectivity that WPANs provide. WPANs, such as those based on short-range wireless communications protocols, provide wireless connectivity to devices by providing wireless links that allow connectivity within a specific distance, such as 5 meters, 10 meter, 20 meters, 100 meters, etc.

Short-range wireless communications protocols may include the Bluetooth® (BT) protocol, the Bluetooth® Low Energy (BLE) protocol, the Zigbee® protocol, and so forth. BT is a wireless technology standard that enables radio frequency communication with ultra-high frequency (UHF) radio waves in the globally accepted Industrial, Scientific & Medical (ISM) band, such as from 2.400 gigahertz (GHz) to 2.485 GHz). Similarly, BLE defines a standard that enables radio frequency communication operating within the 2.4 GHz ISM band.

A short-range wireless communications protocol may be used to connect devices over a WPAN. Examples of devices that may communicate over a WPAN may include laptop computers, tablet computers, smart phones, personal data assistants, audio systems, wearable devices, battery-operated sensors and actuators in various medical, industrial, consumer, and fitness applications, and so forth. Illustratively, examples of the aforementioned audio systems may include headsets, headphones, speakers, and the like, and examples of the aforementioned wearable devices may include smart watches, fitness trackers, heartrate monitors, and the like.

Some devices may be configured to communication in both a WPAN and a wireless local area network (WLAN). This WPAN/WLAN coexistence may be controlled by a device. However, the coexistence may affect the latency of communication in the WLAN and/or communication in the WPAN. Thus, a need exists for an approach to addressing the latency commensurate with WPAN/WLAN coexistence, such as BT and Wi-Fi coexistence.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various standards and protocols for use with a wireless personal area network (WPAN), such as the Bluetooth® (BT) and/or Bluetooth® Low Energy (BLE), may provide for data from one device to be output on another device. For example, a smartphone may be connected with a headset over a short-range wireless communications link and may send audio data to the headset to be played through speakers of the headset. In some contexts, the one device providing the data may be referred to as a "source device," and the other device receiving the data may be referred to as a "sink device." The source device may "stream" data to the sink device, such as an audio stream and/or video stream.

In some scenarios, the conditions present while a source device is sending data packets to a sink device may change. For example, the channel conditions associated with the short-range wireless communications link may degrade. In another example, the source of data at the source device may change, such as when a user changes from a video playback application to a gaming application.

In order to improve the experience of a user, changing conditions may be addressed according to various configurations and/or approaches described in the present disclosure. By applying some or all of the concepts described herein, a user may experience a relatively smoother output of data at a sink device, for example, when the channel conditions change, when the user switches to a new application generating an audio and/or video stream, and so forth.

Various approaches described in the present disclosure may configure the time interval between data packets and/or sizes of the data packets to be sent over a short-range wireless communications link. For example, the period between packets and/or packet size may be adjusted based on channel conditions, based on an application that is the source of data, etc. This adjustment of the time interval and/or packet size may be dynamically performed, for example, so that the short-range wireless communications link may be maintained and the user may experience a relatively seamless transition. However, the adjustment of the period between packets and/or packet size may be coordinated with other wireless and/or radio access technology communication by the source device, such as Wi-Fi.

In an aspect of the disclosure, a method, a computer-readable medium, and an apparatus are provided. The apparatus may implemented as a first device. The first device may determine a time interval between each of a set of packets to be transmitted over a short-range wireless communications link with a second device. The first device may encode data with a bitrate that is based on the time interval. The first device may packetize the encoded data in the set of packets. The first device may transmit the set of packets to the second device or the short-range wireless communications link, and each of the set of packets may be separated by the time interval when transmitted.

In one aspect, the time interval may be based on scheduling information associated with a second communications technology of the first device. In one aspect, scheduling associated with the second communications technology of the first device may be based on the time interval. The first device may adjust a communication window associated with the second communications technology based on the time interval, and the first device may transmit one or more packets associated with the second communications technology in the communication window. In one aspect, the encoding the data with the bitrate is further based on a size of each of the set of packets. In one aspect, the first device may determine a channel condition associated with the short-range wireless communications link, and the time interval may be determined based on the channel condition. In one aspect, the channel condition may be based on one or more of a reference signal strength indicator, a channel quality report received from the second device, a number of messages indicating a retransmission request received from the second device, or a number of retransmission packets transmitted to the second device.

In one aspect, the time interval may be determined based on an application associated with the data. In one aspect, the first device may further determine, based on the time interval, a respective time to play (TTP) associated with each encoded data packetized in each of the set of packets, wherein each of the set of packets includes the respective TTP. In one aspect, the first device may further configure at least one type of scanning based on the time interval. In one aspect, the first device may further adjust the time interval between each of the set of packets to be transmitted over the short-range wireless communications link. In one aspect, the short-range wireless communications link is one of an advanced audio distribution profile (A2DP) link or a BLE link.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 5A-5D illustrate packet transmission in a wireless communications system, in accordance with certain aspects of the disclosure.

DETAILED DESCRIPTION

Figure 1:
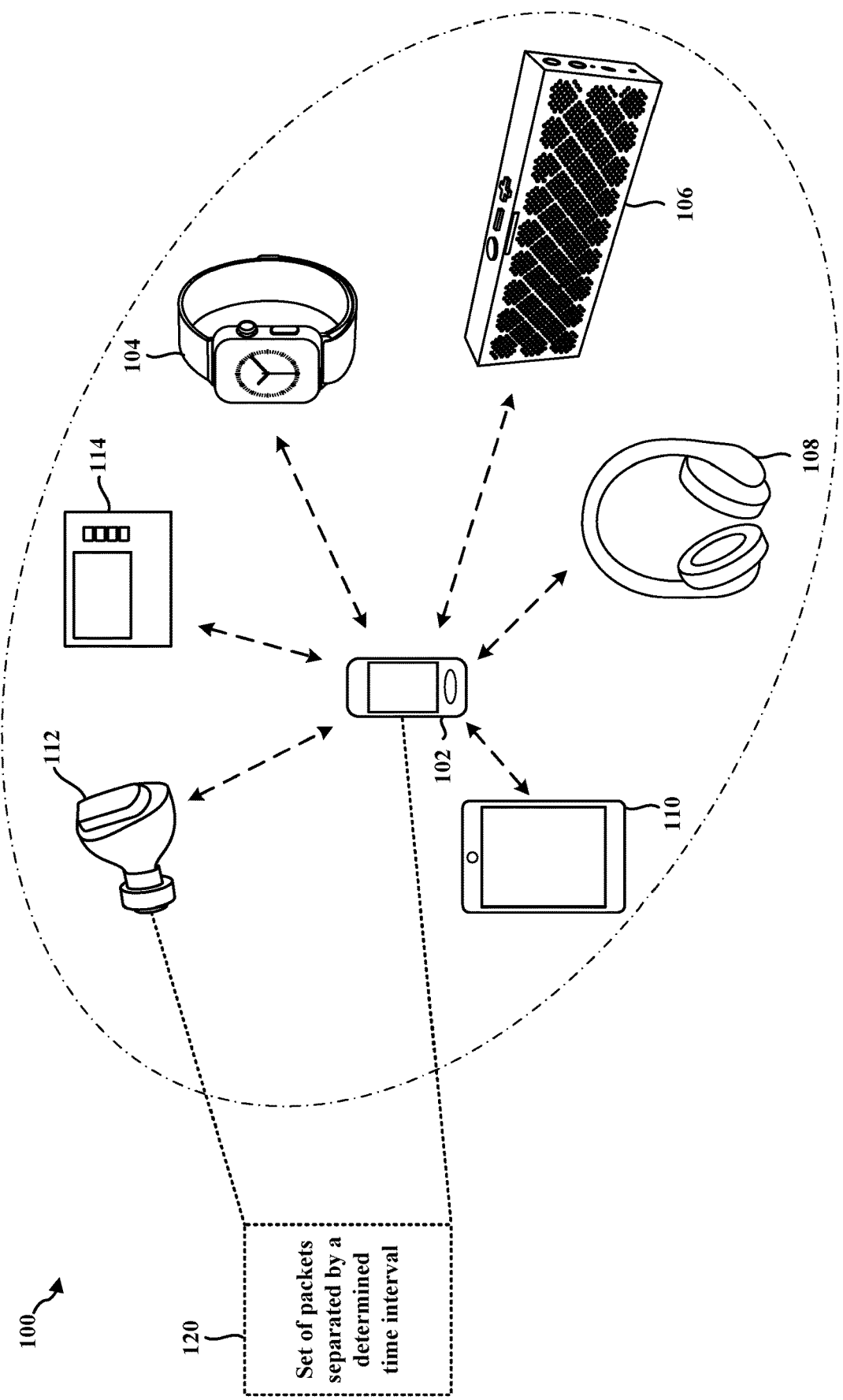
FIG. 1 is a diagram illustrating an example of a WPAN, in accordance with certain aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates an example wireless personal area network (WPAN) 100 in accordance with certain aspects of the disclosure. Within the WPAN 100, a wireless device 102 may use a communications link 116 to communicate with one or more peripheral devices 104, 106, 108, 110, 112, 114 using a short-range wireless communications protocol. The short-range wireless communications protocol may include a Bluetooth® (BT) protocol or a BT Low Energy (BLE) protocol. The present disclosure may describe various aspects and/or configurations in the context of BT and/or BLE. The BT and/or BLE context, however, is presented by way of illustration, and the concepts described herein may be applicable to other WPANs, which may implement other protocols.

Examples of the wireless device 102 include a cellular phone, a smart phone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player, a camera, a game console, a tablet, a smart device, a wearable device, a vehicle, an electric meter, a gas pump, a toaster, a thermostat, a hearing aid, a wireless headset, a blood glucose on-body unit, an Internet-of-Things (IoT) device, or any other similarly functioning device.

Examples of the one or more peripheral devices 104, 106, 108, 110, 112, 114 include a cellular phone, a smart phone, a SIP phone, a STA, a laptop, a PC, a desktop computer, a PDA, a satellite radio, a global positioning system, a multimedia device, a video device, a digital audio player, a camera, a game console, a tablet, a smart device, a wearable device, a vehicle, an electric meter, a gas pump, a toaster, a thermostat, a hearing aid, a wireless headset, a blood glucose on-body unit, an IoT device, or any other similarly functioning device. Although the wireless device 102 is illustrated in communication with six peripheral devices 104, 106, 108, 110, 112, 114 in the WPAN 100, the wireless device 102 may communicate with more or fewer than six peripheral devices within the WPAN 100 without departing from the scope of the present disclosure.

A device implementing the BT protocol, such as the wireless device 102, may operate according to one radio mode, such as basic rate (BR)/enhanced data rate (EDR), and a device implementing the BLE protocol may operation according to a BLE radio mode. In some aspects, a device, such as the wireless device 102, may be configured with dual radio modes, and therefore may be able to operate according to the BR/EDR mode or the BLE mode, for example, based on the type of short-rage wireless communication in which the device may engage.

For example, the device may operate according to the BR/EDR mode for continuous streaming of data, for broadcast networks, for mesh networks, and/or for some other applications in which a relatively higher data rate may be more suitable. However, the device may operate according to the BLE mode for short burst data transmissions, such as for some other applications in which power conservation may be desirable and/or a relatively lower data rate may be acceptable. In other aspects, a device may operate according to one or more other radio modes, including proprietary radio mode(s). Examples of other radio modes may include high speed radio modes, low energy radio modes, isochronous radio modes, etc.

A short-range wireless communications protocol, such as BT and/or BLE, may include and/or may use one or more other communications protocols, for example, when establishing and maintaining communications links. As illustrated, the wireless device 102 may establish a communications link 116 with at least one other device, such as the headset 112, according to at least one communications protocol for short-range wireless communications.

The communications link 116 may include a communications link that adheres to a protocol included and/or for use with BT or BLE. In one aspect, the communications link 116 may include an asynchronous connection-less (ACL) link. With ACL, the wireless device 102 may connect (or "pair" in the terminology of the BT specification) with a second device, such as the headset 112. The connection is asynchronous in that the two devices may not need to synchronize, time-wise, data communications between each other to permit communication of data packets via the communications link 116.

In one aspect, the communications link 116 may include an Advanced Audio Distribution Profile (A2DP) link. An A2DP link provide for a point-to-point link between a source device and a sink device, such as the wireless device 102 and the headset 112, respectively. With an A2DP link, data packets including audio may be transmitted over an ACL data channel. Other information, such as information for controlling the audio stream, may be transmitted over a separate control channel. The data packets may occur non-periodically.

In another aspect, the communications link 116 may support synchronous logical transport mechanisms between a "master device" and a "slave device," such as the wireless device 102 and the headset 112, respectively. For example, the communications link 116 may include a synchronous connection oriented (SCO) link. An SCO link may provide a symmetric point-to-point link between a master device and a slave device using time slots reserved for BT communications. However, an SCO link may not support retransmission of data packets, which may be unsatisfactory in audio streaming and/or voice use cases in which a dropped audio or voice packet may reduce the quality of the user experience.

In a further aspect, then, the communications link 116 may include an extended SCO (eSCO) link. An eSCO link may provide a symmetric or asymmetric point-to-point link between a master device and a slave device using time slots reserved for BT communications, and may also provide for a retransmission window following the reserved time slots. Because retransmissions may be facilitated using the retransmission window, an eSCO link may be suitable for audio streaming and/or voice use cases because a dropped audio or voice packet may be retransmitted, and therefore the probability of successfully receiving a data packet may be increased.

In one aspect, the communications link 116 may include an isochronous (ISO) link. With an ISO link, the communications link 116 may combine some features of both synchronous and asynchronous links. For example, a stream on an ISO link may begin with a start packet, and then data packets may be asynchronously transmitted. Illustratively, the wireless device 102 may be a transmitting device on an ISO link, and the headset 112 may be a receiving device on the ISO link. On the ISO link, the number of retransmission attempts by the transmitting device may be limited. Thus, if the receiving device is unable to decode a data packet within the limited number of retransmission attempts, then the data packet may be dropped and the receiving device may continue to receive the stream without data from the dropped data packet.

Due to various factors, conditions of the transmission of data packets over the communications link 116 may change, such as while the wireless device 102 is sending packets to the headset 112 over the communications link 116. For example, channel conditions may change, such as due to an increase or decrease of interference on the communications link 116. In another example, the source of the data packets at the wireless device 102 may change—illustratively, the source of the data packets may change from a first application executed by the wireless device 102 to a second application executed by the wireless device 102.

Various conditions (and combinations thereof) may affect the transmission of data packets over the communications link 116. Regardless, the wireless device 102 and the headset 112 may still expect relatively low latency and/or reliable delivery of data packets over the communications link 116—for example, to ensure a satisfactory user experience. However, some types of links may be generally unsuited to address one or more changing conditions, for example, without the techniques and approaches described herein. By way of illustration, an A2DP link may not be designed for low-latency streaming of data packets. In another example, an eSCO link may not support the requisite bandwidth for reliable, high-quality streaming of data packets.

Additionally, some short-range wireless communications protocols may be unreliable. For example, when the communications link 116 includes a BT link between the wireless device 102 and the headset 112, then the communications link 116 may be inherently unreliable, such as due to the distance between the wireless device 102 and the headset 112, obstacles between the wireless device 102 and the headset 112, and/or other various RF interference factors, such as Digital Enhanced Cordless Telecommunications (DECT) phones, Wi-Fi access points (APs), microwave ovens, etc. However, streaming of the set of packets 120 over the communications link 116 should be reliable, for example, in order to provide a satisfactory user experience. For example, when the set of packets 120 includes audio streamed from the wireless device 102 to the headset 112, dropped packets, concealed packets, and/or similar glitches should occur very rarely. TABLE 1, infra, illustrates the bit error rate (BER) in relation to the packet error rate (PER) over a BT link, for example, in order to maintain a reliable delivery of the set of packets 120 with no more than one glitch per hour.

described herein may be applicable to other wireless/radio access technologies, such as 5G New Radio (NR), Long Term Evolution (LTE), LTE-Advanced (LTE-A), Wi-Fi Direct, and so forth.

Further, the wireless device 102 may be configured to dynamically adjust the time interval between data packets sent over the communications link 116. Accordingly, the wireless device 102 may determine a time interval that is to occur between data packets sent over the communications link 116, and the wireless device 102 may send a set of data packets 120 over the communications link 116 separated by the determined time interval. By providing for dynamic adjust of the time interval between the set of packets 120 sent over the communications link 116, the probability of delivering reliable, high-quality, and/or low-latency data packets by the wireless device 102 may be increased.

Toward the reliable, high-quality, and/or low-latency delivery of the set of data packets 120, the wireless device 102 may be configured to determine the time interval between each of a set of packets (e.g., the set of packets 120) to be transmitted over a short-range wireless communications link (e.g., the communications link 116) with a second device (e.g., the headset 112). The wireless device 102 may encode data with a bitrate that is determined based on the time interval. The wireless device 102 may packetize the encoded data in the set of packets (e.g., the set of packets 120). Subsequently, the wireless device 102 may transmit the set of packets (e.g., the set of packets 120) over the short-range wireless communications link (e.g., the communications link 116) to the second device (e.g., the headset 112), and each of the set of packets may be separated by the determined time interval when transmitted.

In one aspect, the time interval may be based on scheduling information associated with Wi-Fi communication by the wireless device 102. In another aspect, scheduling associated with Wi-Fi communication by the wireless device 102 may be based on the determined time interval. In one aspect, the encoding the data with the bitrate by the wireless device 102 may be further based on a size of each of the set of packets (e.g., the set of packets 120).

In a further aspect, the wireless device 102 may be further configured to determine a channel condition associated with the short-range wireless communications link (e.g., the communications link 116) with the second device (e.g., the headset 112). The time interval may be determined by the wireless device 102 based on the determined channel condition. For example, the channel condition may be based on one or more of a reference signal strength indicator (RSSI),

TABLE 1

| BER | PER | PER 1 repeat | PER 2 repeat | PER 3 repeat |
|---|---|---|---|---|
| $5.7 \times 10^{-4}$ | 47.3% | 22.36% | 10.57% | 5% |
| $10^{-4}$ | 10.596% | 1.12% | 0.119% | 0.0126% |
| $3.12 \times 10^{-5}$ | 3.433% | 0.179% | 0.004% | 0.000139% |
| $10^{-5}$ | 1.11% | 0.0124% | 0.000138% | |
| $10^{-6}$ | 0.112% | 0.000125% | | |
| $1.25 \times 10^{-9}$ | 0.000139% | | | |

The present disclosure may provide various techniques and approaches for providing reliable, high-quality, and/or low-latency streaming of data packets over the communications link 116. For example, the wireless device 102 may be configured to coordinate short-range wireless communications with another wireless/radio access technology (RAT), such as Wi-Fi. While the present disclosure may describe coexistence with reference to Wi-Fi, the concepts a channel quality report received from the second device (e.g., the headset 112), a number of messages indicating a retransmission request received from the second device, and/or a number of retransmission packets transmitted to the second device. In another example, the wireless device 102 may determine the time interval based on an application associated with the data (e.g., an application that may generate the data to be sent to the headset 112).

In a further aspect, the wireless device 102 may be configured to transmit, to the second device (e.g., the headset 112), information indicating a time to play (TTP) associated with the data. The TTP may be based on the determined time interval. In a further aspect, the wireless device 102 may be configured to disable at least one of page scanning and/or inquiry scanning based on the determined time interval.

The wireless device 102 may be configured to adjust the time interval between each of the set of packets to be transmitted over the short-range wireless communications link (e.g., the communications link 116). For example, the wireless device 102 may dynamically adjust the time interval while sending the set of packets (e.g., the set of packets 120) over the short-range wireless communications link. The short-range wireless communications link (e.g., the communications link 116) may include one of an A2DP link or a BLE link.

The wireless device 102 may include suitable logic, circuitry, interfaces, processors, and/or code that may be used to communicate with one or more peripheral devices 104, 106, 108, 110, 112, 114 using the techniques as described herein. The wireless device 102 may operate to establish a short-range wireless communications connection with at least one of the peripheral devices 104, 106, 108, 110, 112, 114, and the wireless device 102 may establish the communications link 116 with at least one of the peripheral devices 104, 106, 108, 110, 112, 114. With respect to BT, for example, the wireless device 102 may establish the communications link 116 through a link manager (LM) with an intended peripheral device 104, 106, 108, 110, 112, 114. With respect to BLE, for example, the wireless device 102 may establish the communications link 116 through a link layer (LL) with an intended peripheral device 104, 106, 108, 110, 112, 114.

Referring again to FIG. 1, in certain aspects, the wireless device 102 and/or a peripheral device (e.g., headset 112) may be configured to establish a communications link 116, and adjust the time interval between the set of packets 120, as described herein.

Figure 2:
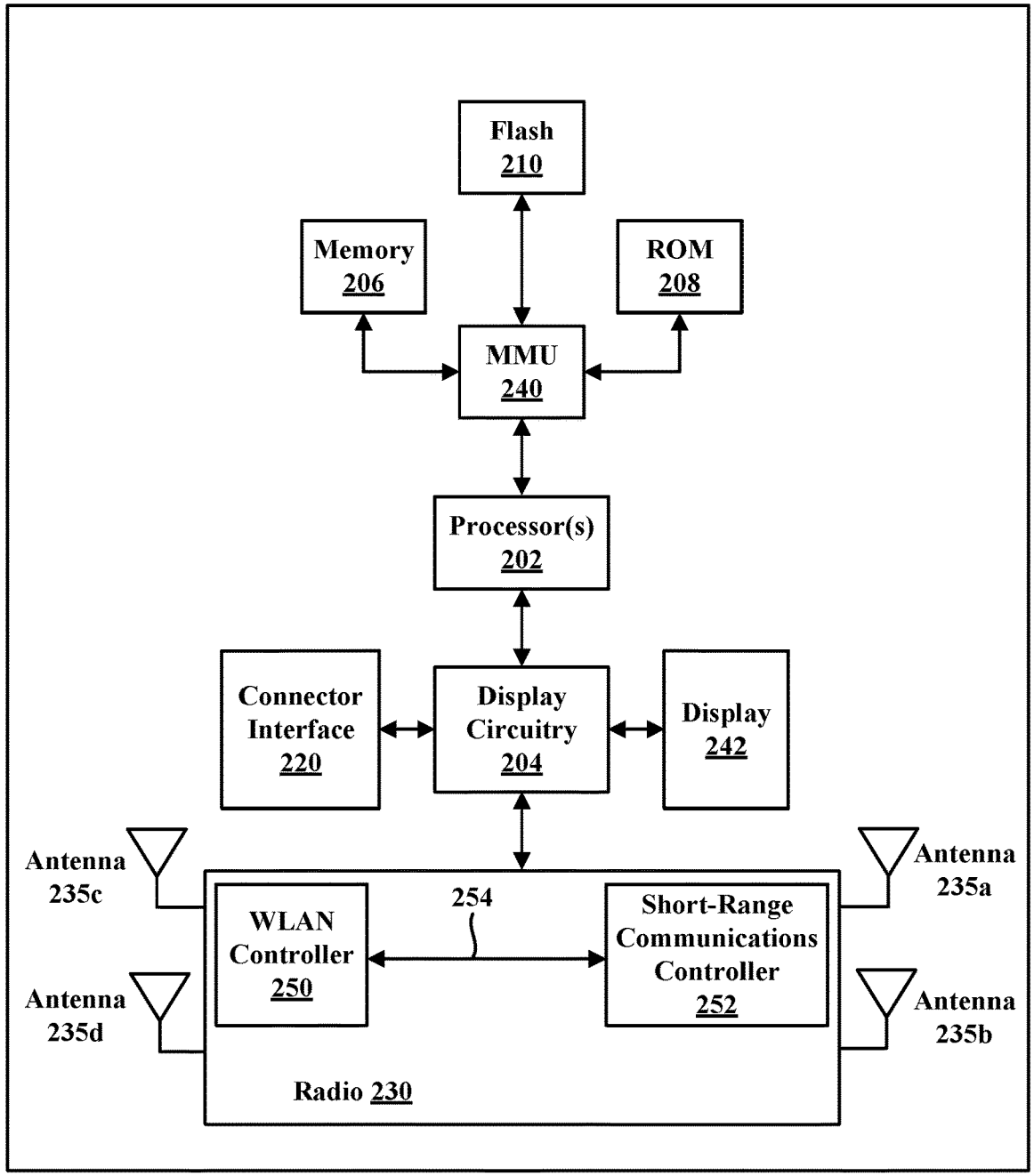
FIG. 2 is block diagram of a short-range wireless communications device, in accordance with certain aspects of the disclosure.

FIG. 2 is block diagram of a wireless device 200 in accordance with certain aspects of the disclosure. The wireless device 200 may correspond to, e.g., the wireless device 102, and/or one of the peripheral devices 104, 106, 108, 110, 112, 114 in FIG. 1. In certain configurations, the wireless device 200 may be, e.g., a BT and/or BLE device that is configured to adjust the time interval between a set of packets to be transmitted over a short-range wireless communications link.

As shown in FIG. 2, the wireless device 200 may include a processing element, such as a processor(s) 202, which may execute program instructions for the wireless device 200. The wireless device 200 may also include display circuitry 204, which may perform graphics processing and provide display signals to a display 242. The processor(s) 202 may also be coupled to a memory management unit (MMU) 240, which may be configured to receive addresses from the processor(s) 202 and translate those addresses to locations in memory (e.g., memory 206, ROM 208, Flash memory 210) and/or to other circuits or devices, such as the display circuitry 204, a radio 230, a connector interface 220, and/or the display 242. The MMU 240 may be configured to perform memory protection and page table translation or set up. In some implementations, the MMU 240 may be included as a portion of the processor(s) 202.

As shown, the processor 202 may be coupled to various other circuits of the wireless device 200. For example, the wireless device 200 may include various types of memory, the connector interface 220 (e.g., for coupling to the computer system), the display 242, and/or wireless communications circuitry (e.g., for Wi-Fi, BT, BLE, etc.). The wireless device 200 may include a plurality of antennas 235a, 235b, 235c, 235d, for performing wireless communication with other short-range wireless communications devices (e.g., BT devices, BLE devices, etc.).

In certain aspects, the wireless device 200 may include hardware and software components (a processing element) configured to adjust the time interval between a set of packets to be transmitted over a short-range wireless communications link, e.g., using the techniques described herein. The wireless device 200 may also include firmware or other hardware/software for controlling short-range wireless communications operations (e.g., BT operations, BLE operations, etc.). In addition, the wireless device 200 may store and execute a WLAN software driver for controlling WLAN operations.

The wireless device 200 may be configured to implement part or all of the techniques described herein, e.g., by executing program instructions stored on a memory medium (e.g., a non-transitory computer-readable memory medium) and/or through hardware or firmware operation. In other implementations, the techniques described herein may be at least partially implemented by a programmable hardware element, such as an field programmable gate array (FPGA), and/or as an application specific integrated circuit (ASIC).

In certain aspects, the radio 230 may include separate controllers configured to control communications for various respective RAT protocols. For example, as shown in FIG. 2, radio 230 may include a wireless local area network (WLAN) controller 250 configured to control WLAN communications and a short-range communications controller 252 configured to control short-range communications (e.g., BT communications, BLE communications, etc.). A coexistence interface 254 (e.g., a wired interface) may be used for sending information between the WLAN controller 250 and the short-range communications controller 252. In some aspects, one or more of the WLAN controller 250 and/or the short-range communications controller 252 may be implemented as hardware, software, firmware or some combination thereof.

In certain aspects, the WLAN controller 250 may be configured to communicate with a second device using a WLAN link using all of the antennas 235a, 235b, 235c, 235d. In certain configurations, the short-range communications controller 252 may be configured to implement a short-range wireless communications protocol stack, such as a BT stack (see, e.g., FIG. 3A, infra) and/or a BLE stack (see, e.g., FIG. 3B, infra), and communicate with at least one second wireless device using one or more of the antennas 235a, 235b, 235c, 235d. The short-range communications controller 252 may be configured to adjust the time interval between each of a set of packets to be transmitted over a short-range wireless communications link, e.g., by coordinating scheduling for the set of packets with scheduling by the WLAN controller 250 (e.g., scheduling for Wi-Fi).

The WLAN controller 250 may control Wi-Fi communications, but may be an example of a component of the wireless device 200, and the wireless device 200 may include other and/or additional components according to different configurations. In one example, the WLAN controller 250 may additionally or alternatively control Wi-Fi Direct (e.g., for coexistence). In another example, the wireless device 200 may include a cellular controller configured to control cellular communications according to various radio access technologies, including 5G NR, LTE, LTE-A, etc. In such configurations, communication coexistence may be managed via communication between the short-range communications controller 252 and the cellular controller, which may be communicatively coupled over an interface similar to the coexistence interface 254.

Figure 3A:
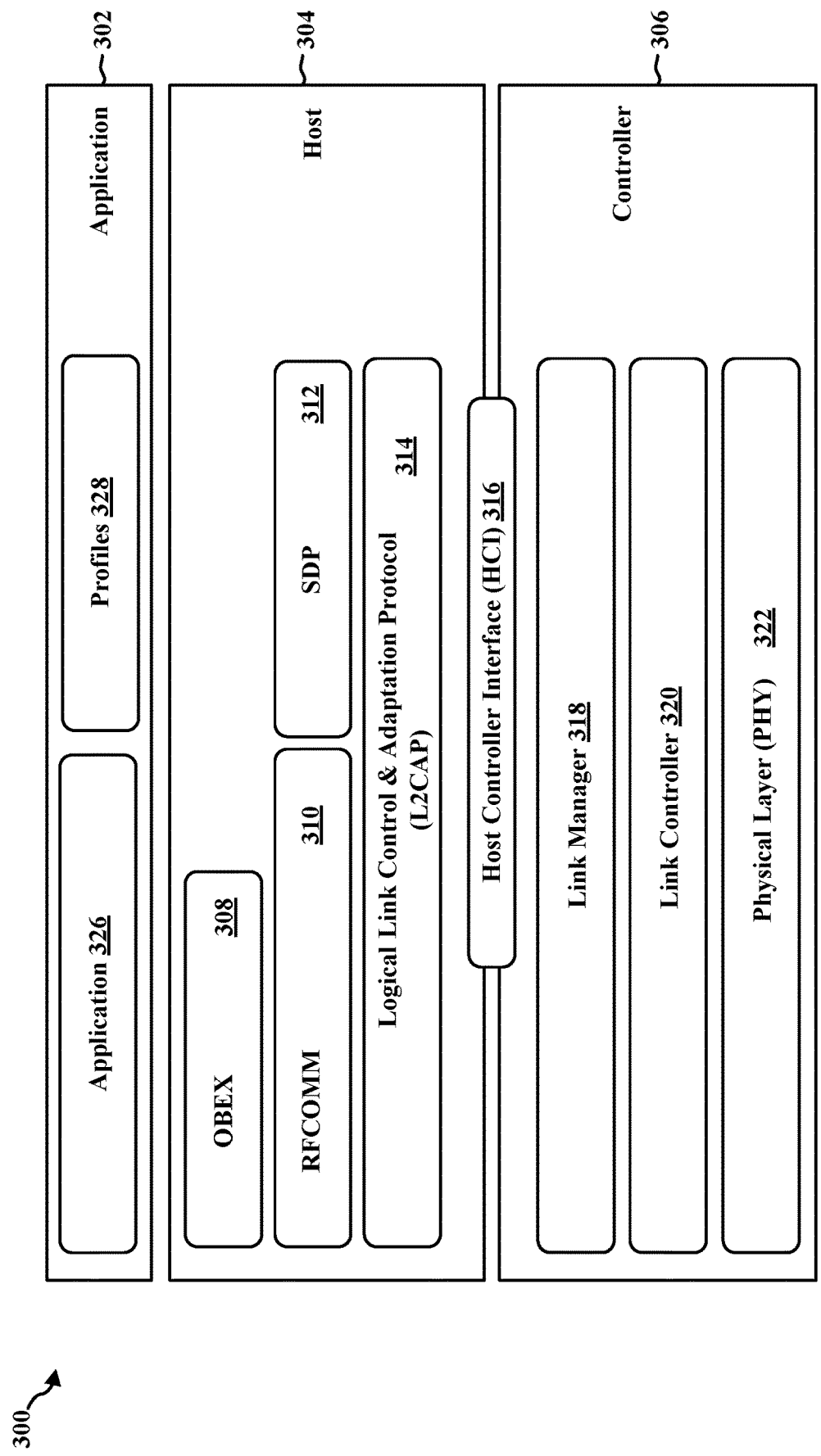
FIG. 3A is a diagram illustrating a Bluetooth protocol stack that may be implemented by a device, in accordance with certain aspects of the disclosure.

FIG. 3A illustrates a BT protocol stack 300 that may be implemented in a wireless device in accordance with certain aspects of the disclosure. For example, the BT protocol stack 300 may be implemented by, e.g., one or more of processor(s) 202, memory 206, Flash memory 210, ROM 208, the radio 230, and/or the short-range communications controller 252 illustrated in FIG. 2.

Referring to FIG. 3A, the BT protocol stack 300 may be organized into lower layer(s), a middle layer(s), and upper layer(s). The lower layer(s) of the BT protocol stack 300 may include a controller stack 306, which may be used for, inter alia, hardware interface management, link establishment, and link management. The middle layer(s) of the BT protocol stack 300 may include a host stack 304, which may be used for, inter alia, application (layer) interface management to allow an application (layer) to access short-range wireless communications. The higher layer(s) of the BT protocol stack 300 may include an application layer 302, which may include one or more applications and one or more profiles that allow the one or more applications to use BT communications.

The controller stack 306 may include a physical (PHY) layer 322. The PHY layer 322 may include, for example, a radio and/or a baseband processor. In some aspects, the PHY layer 322 may define the mechanism for transmitting a bit stream over a physical link or channel that connects BT devices. The bit stream may be grouped into code words or symbols, and converted to a data packet that is transmitted over a wireless transmission medium. The PHY layer 322 may provide an electrical, mechanical, and/or procedural interface to the wireless transmission medium. The PHY layer 322 may be responsible for modulation and demodulation of data into radio frequency (RF) signals for transmission over the air. The PHY layer 322 may describe the physical characteristics of a wireless device's receiver/transmitter. The physical characteristics may include modulation characteristics, radio frequency tolerance, sensitivity level, etc.

The controller stack 306 may further include a link controller 320. The link controller 320 may be responsible for properly formatting data for providing to and obtaining from the PHY layer 322. Further, the link controller 320 may perform synchronization of links (e.g., logical links including ACL links, A2DP links, SCO links, eSCO links, ISO links, etc.). The link controller 320 may be responsible for executing commands and instructions issued by a link manager 318, including establishing and maintaining links instructed by the link manager 318.

The link manager 318 may translate host controller interface (HCI) 316 commands into controller-level operations (e.g., baseband-level operations). The link manager 318 may be responsible for establishing and configuring links and managing power-change requests, among other tasks. Each type of logical link (e.g., ACL links, A2DP links, SCO links, eSCO links, ISO links, etc.) may be associated with a specific packet type. For example, an SCO link may provide reserved channel bandwidth for communication between a master device and a slave device, and support regular, periodic exchange of data packets with no retransmissions. An eSCO link may provide reserved channel bandwidth for communication between a master device and a slave device, and support regular, periodic exchange of data packets with retransmissions. An ACL link may exist between a master device and a slave device from the beginning of establishment of a connection between the master device and the slave device, and the data packets for ACL links may include encoding information in addition to a payload.

The link manager 318 may communicate with the host stack 304 through a host controller interface (HCI) 316—e.g., the link manager 318 may translate HCI 316 commands into controller-level operations (e.g., baseband-level operations). The HCI 316 may act as a boundary between the lower layers (e.g., the controller stack 306) of the BT protocol stack 300 and the other layers of the BT protocol stack (e.g., the host stack 304 and the application layer 302). The BT specification may define a standard HCI to support BT systems that are implemented across two separate processors. For example, a BT system on a computer might use the BT system's own processor to implement the lower layers of the stack (e.g., the PHY layer 322, the link controller 320, and/or the link manager 318). The BT system might use a processor of a BY component to implement the other layers (e.g., the host stack 304 and the application layer 302). In some aspects, however, the BT system may be implemented on a same processor, and such a BT system may be referred to as "hostless."

The host stack 304 may include at least a Logical Link Control and Adaptation Protocol (L2CAP) layer 314, a service discovery protocol (SDP) layer 312, a radio frequency communication (RFCOMM) layer 310, and an object exchange (OBEX) layer 308. The L2CAP layer 314 is implemented above the HCI 316, and may communicate through the HCI 316. The L2CAP layer 314 may be primarily responsible for establishing connections across some existing links (e.g., logical links, including ACL links) and/or requesting some links (e.g., logical links, including ACL links) if those do not already exist. Further, the L2CAP layer 314 may implement multiplexing between different higher-layer protocols, such as SDP protocols and RFCOMM protocols, which may to allow different applications to use a single link (e.g., a logical link, including an ACL link). In addition, the L2CAP layer 314 may repackage data packets received from higher layers into a format expected by lower layers. The L2CAP layer 314 may employ the concept of channels to keep track of where data packets come from and where data packets should go. A channel may be a logical representation of the data flow or stream between the L2CAP layer 314 at a transmitting device (e.g., a master device) and another L2CAP layer 314 at a receiving device (e.g., a slave device).

The SDP layer 312 may define actions for both servers and clients of BT services. The BT specification defines a service as any feature that may be usable by another (remote) BT device. An SDP client may communicate with an SDP server using a reserved channel on an L2CAP link to discover what services are available. When the SDP client finds the desired service, the SDP client may request a separate connection to use the service. The reserved channel may be dedicated to SDP communication so that a device knows how to connect to the SDP service on any other device. An SDP server may maintain an SDP database, which may include a set of service records that describe the services the SDP server offers. Along with information describing how an SDP client can connect to the service, the service records may contain a universally unique identifier (UUID) of the service.

The RFCOMM layer 310 may emulate the serial cable line settings and status of an RS-232 serial port. The RFCOMM layer 310 may connect to the lower layers of the BT protocol stack 300 through the L2CAP layer 314. By providing serial-port emulation, the RFCOMM layer 310 may support legacy serial-port applications. The RFCOMM layer 310 may also support the Object Exchange (OBEX) layer 308.

The OBEX layer 308 may define a communication protocol that may be used by devices to exchange data objects, and the data objects may also be defined by the OBEX layer 308. A BT device that wants to set up an OBEX communication session with another device may be considered the client device. The client initially may send one or more SDP requests to ensure that the other device can act as a server of OBEX services. If the server device can provide OBEX services, the server device may respond with the OBEX service record of the server device. The OBEX service record may contain an RFCOMM channel number that the client device may use to establish an RFCOMM channel. Further communication between the two devices may be conveyed in packets, which may contain requests, responses, and/or data. The format of the packet may be defined by the OBEX session protocol.

The application layer 302 may include at least one application 326, with which a user may interact and which may access BT communications for various functionality. The application 326 may access BT communications through one or more profiles 328, which may describe a variety of different types of tasks. By following procedures of one or more profiles 328, the application 326 may use BT communications according to a BT specification.

Figure 3B:
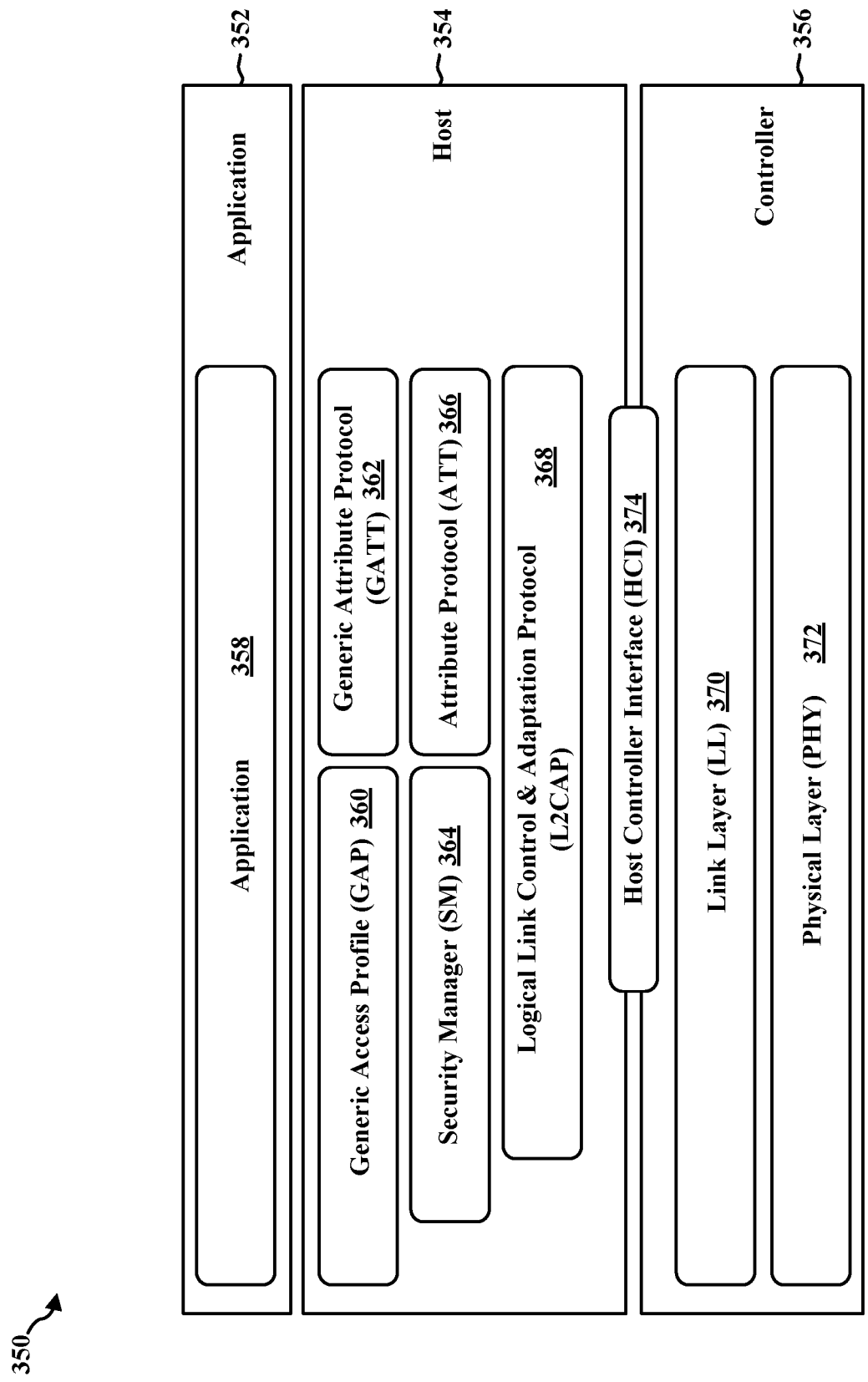
FIG. 3B is a diagram illustrating a Bluetooth Low Energy protocol stack that may be implemented by a device, in accordance with certain aspects of the disclosure.

FIG. 3B illustrates a BLE protocol stack 350 that may be implemented in a BLE device. For example, the BLE protocol stack 350 may be implemented by, e.g., one or more of processor(s) 202, memory 206, Flash memory 210, ROM 208, the radio 230, and/or the short-range communications controller 252 illustrated in FIG. 2.

The BLE protocol stack 350 may be organized into three layers, which may include, an application layer 352, a host stack 354, and a controller stack 356. The controller stack 356 may be below the host stack 354 and the application layer 352 in the BLE protocol stack 350. The controller stack 356 may include a PHY layer 372 and a LL 370.

The PHY layer 372 may define the mechanism for transmitting a bit stream over a physical link that connects BLE devices. The bit stream may be grouped into code words or symbols, and converted to a data packet that is transmitted over a transmission medium. The PHY layer 372 may provide an electrical, mechanical, and procedural interface to the transmission medium. The shapes and properties of the electrical connectors, the frequency band used for transmission, the modulation scheme, and similar low-level parameters may be specified by the PHY layer 372.

The LL 370 is responsible for low-level communication over the PHY layer 372. The LL 370 manages the sequence and timing for transmitting and receiving data packets, and using a LL protocol, communicates with other devices regarding connection parameters and data flow control. The LL 370 also provides gatekeeping functionality to limit exposure and data exchange with other devices. If filtering is configured, the LL 370 maintains a list of allowed devices and will ignore all requests for data exchange from devices not on the list. The LL 370 may also reduce power consumption. In some aspects, the LL 370 may include a company's proprietary LL that may be used to discover peer devices (e.g., other devices associated with the company), and establish a secure communication channel therewith. In certain aspects, the LL 370 may be responsible for transporting data packets between devices in a WPAN. Each data packet may include an access address, which may specify the type of logical transport used to carry the data packet. Logical transports may exist between a master device and slave devices. Additionally, some logical transports may carry multiple logical links.

The BLE protocol stack 350 may include an HCI 374, which may act as a boundary between the lower layers (e.g., the controller stack 356) of the BLE protocol stack 350 and the other layers of the BLE protocol stack (e.g., the host stack 354 and the application layer 352). In addition, the host stack 354 may communicate with a BLE controller (e.g., short-range communications controller 252 in FIG. 2) in a wireless device using the HCI 374. The LL 370 may use the HCI 374 to communicate with the host stack 354 of the BLE protocol stack 350. While some BLE systems may be "hostless," in that the host stack 354 and the controller stack 356 may be implemented on a same processor, the HCI 374 may also allow the host stack 354 to communicate with different controller stacks 356, such as when the controller stack 356 is implemented on a second processor.

The host stack 354 may include a generic access profile (GAP) 360, a generic attribute protocol (GATT) 362, a security manager (SM) 364, an attribute protocol (ATT) 366, and an L2CAP layer 368. The L2CAP layer 368 may encapsulate multiple protocols from the upper layers into a data packet format (and vice versa). The L2CAP layer 368 may also break packets with a large data payload from the upper layers into multiple packets with the data payload segmented into smaller size data payloads that fit into a maximum payload size (e.g., twenty-seven bytes) on the transmit side. Similarly, the L2CAP layer 368 may receive multiple data packets carrying a data payload that has been segmented, and the L2CAP layer 368 may combine the segmented data payload into a single data packet carrying the data payload that will be sent to the upper layers (e.g., the application layer 352).

The ATT 366 includes a client/server protocol based on attributes associated with a BLE device configured for a particular purpose (e.g., monitoring heart rate, temperature, broadcasting advertisements, etc.). The attributes may be discovered, read, and written by peer devices. The set of operations which are executed over ATT 366 may include, but are not limited to, error handling, server configuration, find information, read operations, write operations, queued writes, etc. The ATT 366 may form the basis of data exchange between BLE devices.

The SM 364 may be responsible for device pairing and key distribution. A security manager protocol implemented by the SM 364 may define how communications with the SM of a counterpart BLE device are performed. The SM 364 provides additional cryptographic functions that may be used by other components of the BLE protocol stack 350. The architecture of the SM 364 used in BLE is designed to minimize recourse requirements for peripheral devices by shifting work to an assumingly more powerful central device. BLE uses a pairing mechanism for key distribution. The SM 364 provides a mechanism to not only encrypt the data but also to provide data authentication.

Above the host stack 354 in the BLE protocol stack 350, the application layer 352 may include an application 358, such as a user application which interfaces with the host stack 354 of the BLE protocol stack 350 for various functionality through BLE communications.

Referring back to the host stack 354, the GATT 362 may provide a service framework using the attribute protocol for discovering services, and for reading and writing characteristic values on a peer device. The GATT 362 may interface with the application 358, e.g., through a profile, which may define a collection of attributes and any permission needed for the attributes to be used in BLE communications. The GAP 360 may provide an interface for the application 358 to initiate, establish, and manage connections with other BLE devices.

In some aspects, a wireless device (e.g., the wireless device 102, the wireless device 200, etc.) may be configured to communicate according to different standards and/or protocols. For example, the wireless device may be configured with both BT and BLE for short-range wireless communications. Accordingly, the wireless device may be configured with both the BT protocol stack 300 and the BLE protocol stack 350. In some aspects, one or more layers may be configured for use in both the BT protocol stack 300 and the BLE protocol stack 350—e.g., the L2CAP layers 314, 368 of the protocol stacks 300, 350 may be configured for dual mode short-range wireless communications using either BT or BLE.

Figure 4A:
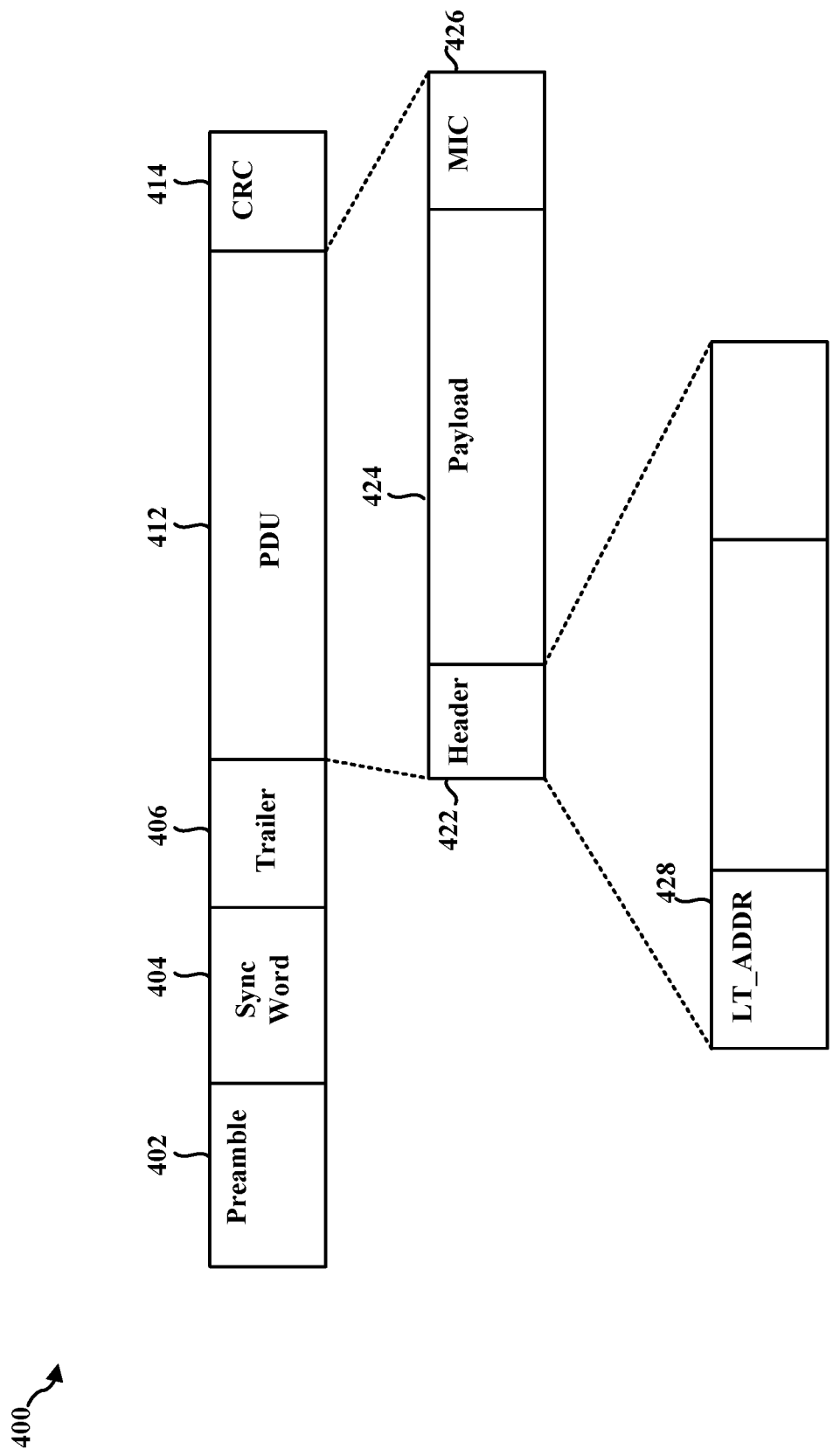
FIG. 4A is a diagram illustrating a Bluetooth packet, in accordance with certain aspects of the disclosure.

FIG. 4A is a diagram illustrating a data packet 400 in accordance with certain aspects of the present disclosure. The data packet may be used with various short range wireless communications technologies, such as BT. Referring to FIG. 1, for example, the data packet 400 may be at least one of the set of packets 120.

The data packet 400 may include a preamble 402, a sync word 404, a trailer 406, a PDU 412, and a CRC 414. In certain configurations, the data packet 400 may not include the CRC 414.

In certain configurations, the PDU 412 may include a header 422, a payload 424, and a MIC 426. The MIC includes information that may be used to authenticate a data packet, e.g., when the data packet is encrypted. In other words, the MIC may be used by the receiving device to confirm that the message came from the stated transmitting device (e.g., data packet authenticity), and to confirm that the payload 424 has not been changed (e.g., data packet integrity). The MIC protects both payload integrity and the authenticity of the data packet 400 by enabling a receiving device who also possess the secret key to detect any changes to the payload 424.

In some aspects, the header 422 of the PDU 412 may include a plurality of fields, including at least an LT_ADDR 428. The LT_ADDR may indicate a logical transport address. The LT_ADDR 428 may be associated with a logical link. For example, a logical transport address included in the LT_ADDR 428 may indicate a type of logical link (e.g., ACL, A2DP, eSCO, ISO, etc.).

Figure 4B:
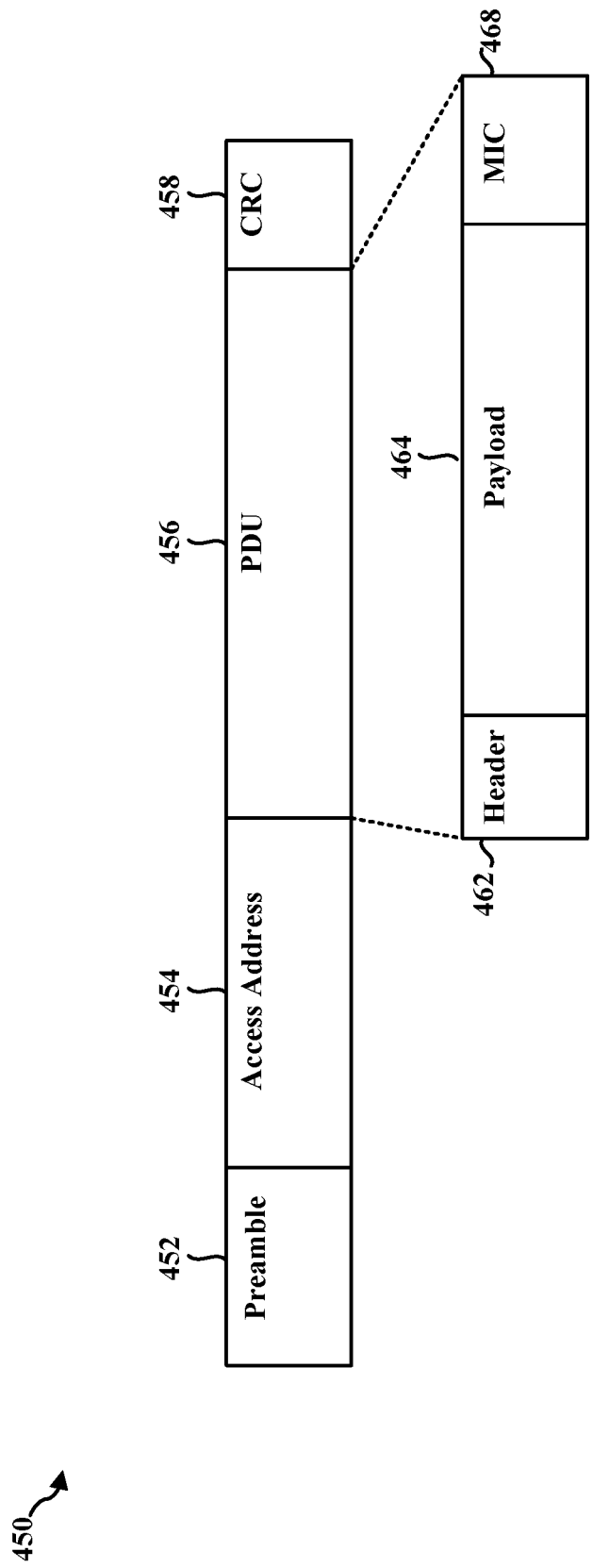
FIG. 4B is a diagram illustrating a Bluetooth Low Energy packet, in accordance with certain aspects of the present disclosure.

FIG. 4B is a diagram illustrating a data packet 450 in accordance with certain aspects of the present disclosure. The data packet may be used with various short range wireless communications technologies, such as BLE. Referring to FIG. 1, for example, the data packet 450 may be at least one of the set of packets 120.

The data packet 450 may include a preamble 452, an access address 454, a PDU 456, and a CRC 458. In certain configurations, the data packet 450 may not include the CRC 458.

In some aspects, the access address 454 may set the address of a link layer (e.g., the link layer 370) connection. For example, the access address 454 may include an address that indicates a type of logical link (e.g., ACL, A2DP, eSCO, ISO, etc.).

In certain configurations, the PDU 456 may include a header 462, a payload 464, and a MIC 468. The MIC includes information that may be used by to authenticate a data packet, e.g., when the data packet is encrypted. In some aspects, the header 462 of the PDU 456 may include a plurality of fields, including at least a logical link identifier (LLID).

FIGS. 5A through 5D illustrate a wireless communications system 500. The wireless communications system 500 may include two devices 502, 504. In some aspects, one device 502 may be implemented as a source device. For example, the source device 502 may be implemented as the wireless device 102 of FIG. 1. The other device 504 may be implemented as a sink device. For example, the sink device 504 may be implemented as the headset 112 of FIG. 1.

The source device 502 and the sink device 504 may establish a short-range wireless communications link 520. The link 520 may include a BT link or BLE link. The source device 502 may send packets to the sink device 504 over the link 520.

The source device 502 may include an encoder 506. The encoder may be configured to encode data, such as audio or video data, with a bitrate (e.g., the number of bits that are processed per unit of time). Illustrative bitrates may be expressed in bits per second (e.g., bit/s).

The source device 502 may further include a transmission (TX) queue 508. The TX queue 508 may be configured to queue packets that are to be transmitted over a short-range wireless communications link 520. The packets to be transmitted over the link 520 may be of a predefined size, e.g., based on the type of link 520 and/or according to which the link is established. For example, data encoded by the encoder 506 may be packetized into a packet 512 of a predefined size. In some aspects, this predefined size may not be dynamically configurable.

The source device 502 may de-queue packets (e.g., the packet 512) from the TX queue 508 and transmit those packets over the link 520. The packets may be received by the sink device 504.

The sink device 504 may include a reception (RX) queue 510 configured to queue packets to be provided to higher layers of the sink device 504. A higher layer of the sink device 504 may include a decoder 514. The decoder 514 may decode data (e.g., audio, video, etc.) included in a payload of a packet (e.g., the packet 512) and cause the sink device 504 to output that data (e.g., as streaming audio, streaming video, etc.).

Referring to FIG. 5A, the encoder 506 may encode a first encoder/decoder (codec) frame 522a with a first bitrate, and provide that first codec frame 522a to the TX queue 508 to be packetized for over-the-air transmission. However, the first codec frame 522a may be too large to be packetized within the packet 512 having the predefined size.

As shown in FIG. 5B, because the first codec frame 522a is too large to fit within the payload of the packet 512, a first portion 522b of the first codec frame 522a may be delayed in transmission to the sink device 504, while a second portion 522c that fits within the payload of the packet 512 is de-queued and transmitted to the sink device 504.

The RX queue 510 may receive the second portion 522c of the first codec frame 522a, and provide that second portion 522c to the decoder 514 to be decoded. However, the decoder 514 may be unable to decode the second portion 522c until the first portion 522b of the first codec frame 522a is received. This delay in delivering the entire first codec frame 522a may cause "jitter" when the decoder 514 is decoding the second portion 522c and, later, the first portion 522b of the first codec frame 522a.

Figure 5C:
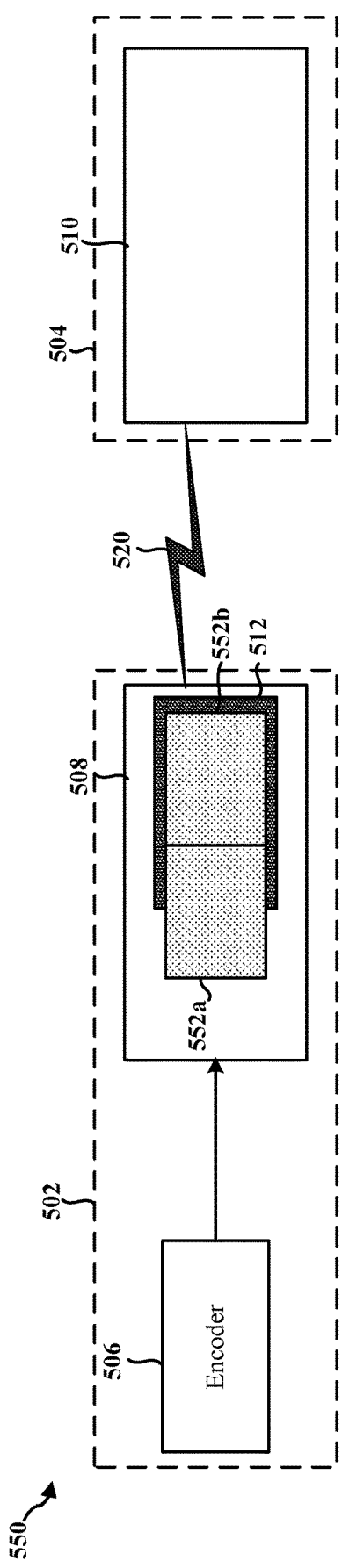
Figure 5D:
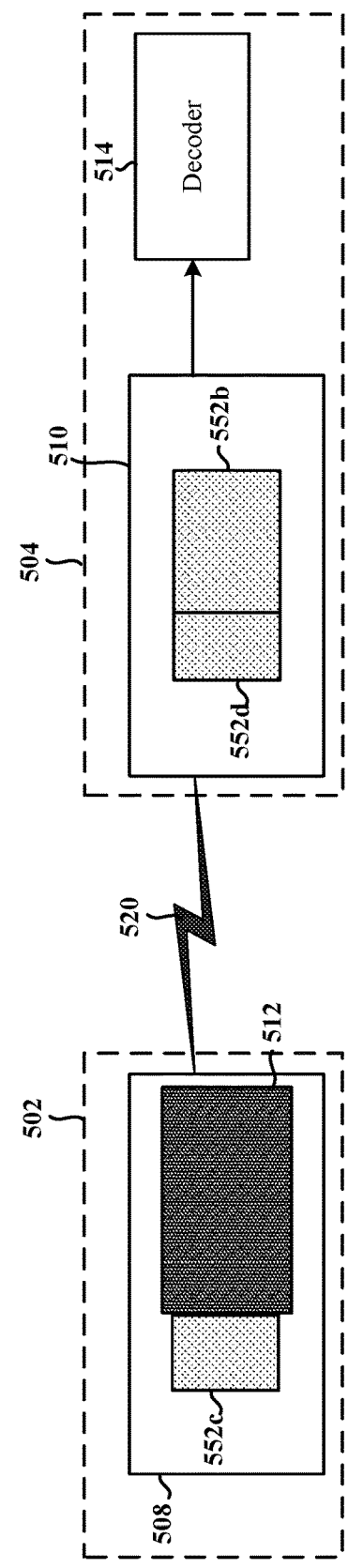

Referring to FIGS. 5C and 5D, a similar issue may occur when codec frames are too small to fit within the payload of the packet 512. As shown at FIG. 5C, the encoder 506 may encode second and third codec frames 552a, 552b according to a second bitrate. When the encoder 506 encodes data with the second bitrate, either the payload of the packet 512 will include a null or empty portion or the second and third codec frames 552, 552b will be split up over two packets.

In either case, a first portion 552c of data from the second codec frame 552a may be delayed in delivery to the sink device 504. As illustrated at FIG. 5D, the RX queue 510 may receive the second portion 552d of the second codec frame 552a and the entire third codec frame 552b, and provide the second portion 552d of the second codec frame 552a and the third codec frame 552b to the decoder 514 to be decoded. However, the decoder 514 may be delayed in decoding the second portion 552d of the second codec frame 552a until the first portion 552c of the second codec frame 552a is received.

The delay in timely delivery of the first codec frame 522a and/or the commensurate "jitter" caused thereby may negatively impact the user experience. Therefore, the encoder 506 of the source device 502 may be configured to encode data with a bitrate (e.g., different from the aforementioned first and second bitrates) that approximately matches the size of the payload of the packet 512. Thus, when delivered to the sink device 504, the decoder 514 may be able to timely decode all codec frames.

While the size of the packet 512 may not be dynamically configurable, the source device 502 may be configured to adjust the bitrate to match the payload size of the packet 512. Correspondingly, the source device 502 may adjust the time interval between the packet 512 and another packet so that those packets may be timely delivered to the sink device 504 for a reliable, high-quality, and/or low-latency data stream over the link 520.

Figure 6A:
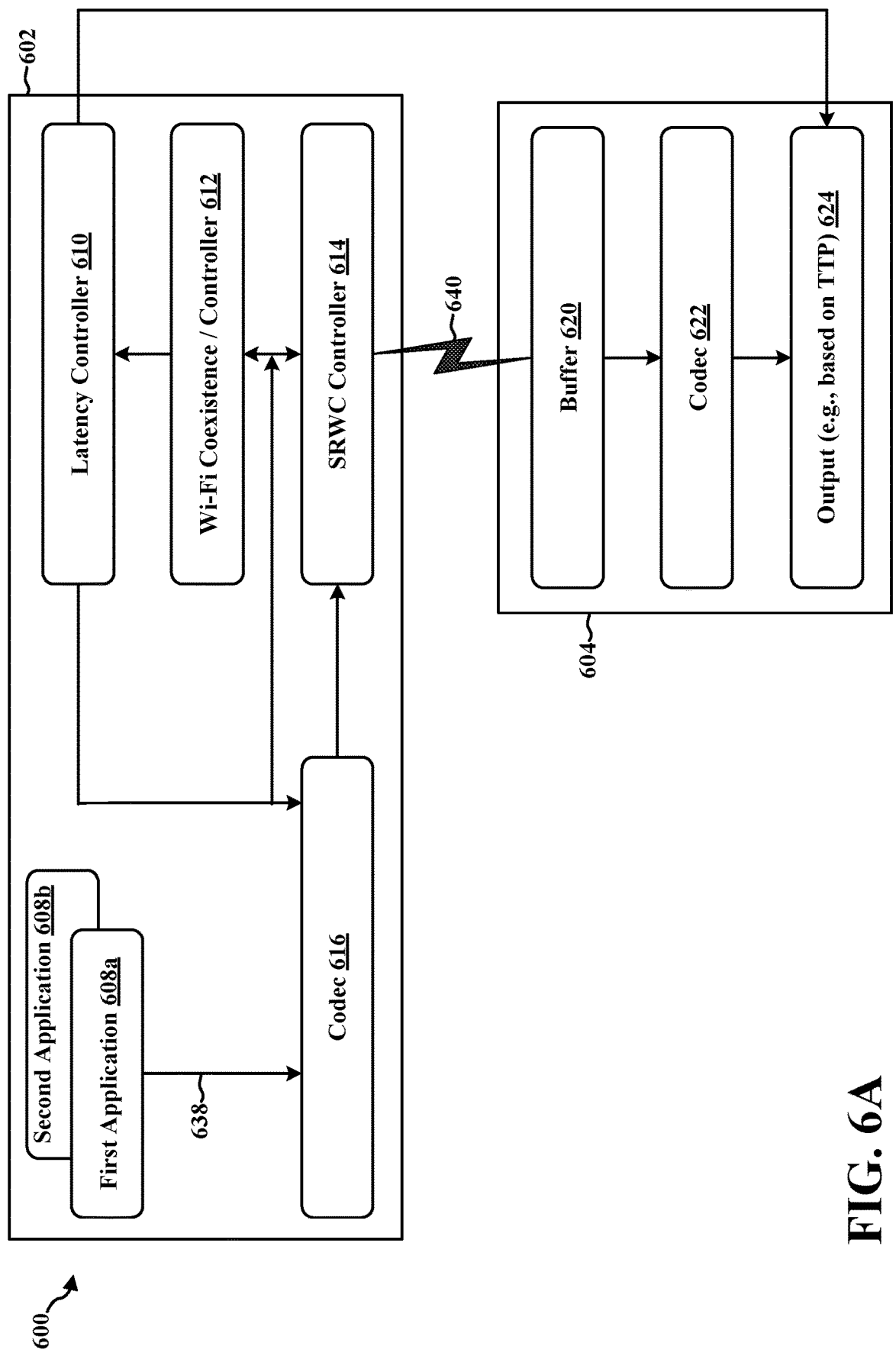
FIGS. 6A-6B illustrate a data flow that may be used for scheduling packets over a short-range wireless communications link, in accordance with certain aspects of the disclosure.
Figure 6B:
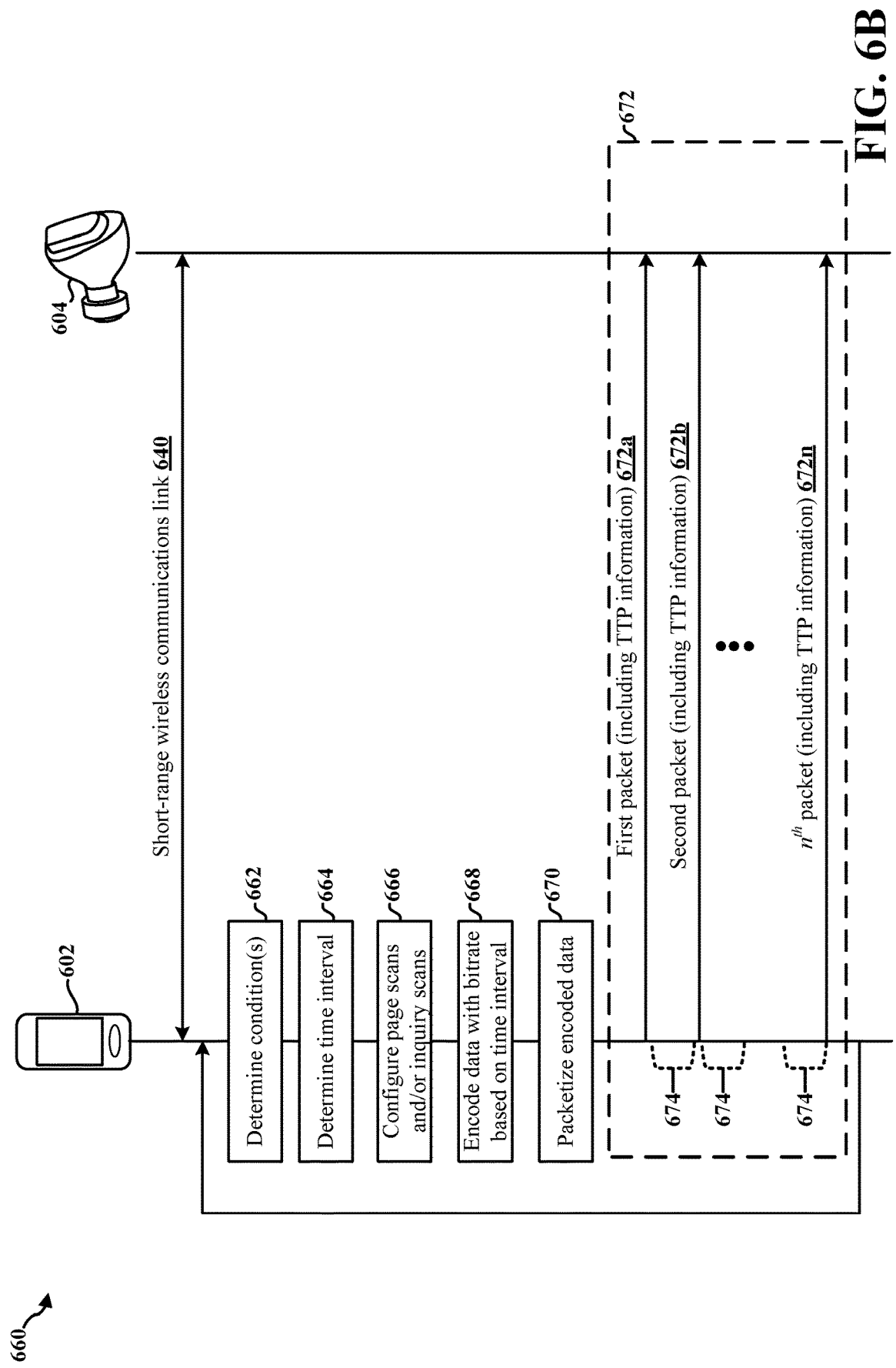

FIGS. 6A and 6B illustrate a data flow for sending packets over a short-range wireless communications link, in accordance with various aspects of the present disclosure. The data flow may illustrate a call flow 660 for a wireless communications system 600. The wireless communications system 600 may include two devices 602, 604. In some aspects, one device 602 may be a source device. For example, the device 602 may be the wireless device 102 of FIG. 1. The other device 604 may be a sink device. For example, the device 604 may be the headset 112 of FIG. 1.

The source device 602 may include at least a first application 608a. The first application 608a may be the source of data to be sent to the sink device 604. For example, the first application 608a may be an audio application (e.g., a streaming music application), a video application (e.g., a streaming video application), a gaming application, or any other application configured to provide data to be sent to the sink device 604 over a short-range wireless communications link 640.

In some aspects, the source device 602 may include a second application 608b. Similar to the first application 608a, the second application 608b may be the source of data to be sent to the sink device 604. For example, the first application 608a may be an audio application (e.g., a streaming music application), a video application (e.g., a streaming video application), a gaming application, or any other application configured to provide data to be sent to the sink device 604 over a short-range wireless communications link 640.

The source device 602 may switch from the first application 608a to the second application 608b as the source of data to be sent to the sink device 604. In switching to the second application 608b, at least one condition of link 640 may change. The source device 602 may adjust communication over the link 640 based on the changed condition, such as by adjusting the time interval between a set of packets sent over the link 640, as described herein.

The source device 602 may further include a codec 616 that may be configured to encode data provided by one of the applications 608a, 608b according to a bitrate. The codec 616 may output encoded data as codec frames. The size of each codec frame may depend on the bitrate with which the data is encoded. In various aspects, the codec 616 may be configured to adjust the bitrate, e.g., based on a payload size of packets and/or based on a time interval between packets to be sent over the link 640.

For sending data over the link 640, the source device 602 may include a short-range wireless communications (SRWC) controller 614. In the context of FIG. 2, for example, the short-range communications controller 252 may include the SRWC controller 614. The SRWC controller 614 may be implemented as hardware, software, firmware, or a combination thereof.

The SRWC controller 614 may be configured to packetize codec frames provided by the codec 616. For example, the SRWC controller 614 may include each codec frame in each payload of each of a set of packets. In some aspects, a codec frame packetized in a payload of a packet may include compressed data (e.g., compressed audio, compressed video, etc.).

The SRWC controller 614 may be configured to schedule packets to be sent over the link 640 to the sink device 604. In so doing, the SRWC controller 614 may schedule packets to be sent over the link 640 so that each of the packets is spaced apart by at least a time interval.

The source device 602 may further include a Wi-Fi coexistence/controller 612 (herein, Wi-Fi controller). In the context of FIG. 2, for example, the WLAN controller 250 may include the Wi-Fi controller 612. The Wi-Fi controller 612 may be implemented as hardware, software, firmware, or a combination thereof. While the present disclosure may describe various aspects/configurations in the context of Wi-Fi, the concepts related thereto (e.g., for scheduling and coexistence) may be applicable to other wireless/radio access technologies, such as Wi-Fi Direct, 5G NR, LTE, LTE-A, and so forth.

The Wi-Fi controller 612 may be configured to schedule other data to be communicated according to a Wi-Fi network. Further, the Wi-Fi controller 612 may be configured to coordinate coexistence between the short-range wireless communications link 640 and a Wi-Fi network link. For example, the Wi-Fi controller 612 may schedule Wi-Fi data to be sent over a Wi-Fi network based on short-range wireless communications scheduling information provided by the SRWC controller 614 and/or the Wi-Fi controller 612 may provide scheduling information about Wi-Fi data to be sent over a Wi-Fi network to the SRWC controller 614. Accordingly, the SRWC controller 614 may be configured to schedule packets to be sent over the link 640 based on Wi-Fi scheduling information provided by the Wi-Fi controller 612.

In some aspects, the Wi-Fi controller 612 may expect a minimum effective bandwidth, such as one megabyte (Mb). With the effective bandwidth, the Wi-Fi controller 612 may be able to access Wi-Fi data over the Wi-Fi network (e.g., data over the Internet). A portion of the Wi-Fi data may be provided to the first and/or second applications 608a, 608b, e.g., so that the first and/or second applications 608a, 608b may provide source data to the codec 616 to be encoded for transmission to the sink device 604.

The effective bandwidth utilized by the Wi-Fi controller 612 may vary, e.g., depending upon the modulation scheme used for Wi-Fi data. For example, an 802.11b Wi-Fi network may use an effective bandwidth of one Mb. An effective bandwidth of one Mb may introduce a channel contention of approximately 100% (not including repeats) with the SRWC controller 614. However, an 802.1 in network may introduce a channel contention of approximately less than 1% with the SRWC controller 614 (e.g., the Wi-Fi controller 612 may operate on a Wi-Fi channel for an 802.1 in network that does not frequently overlap with a channel on which the SRWC controller 614 operates, such as a BT channel). The SRWC controller 614 may be configured to adjust the schedule of packets to be sent over the link 640 based on changing Wi-Fi modulation schemes and commensurate changing of channel contention.

In various aspects, the Wi-Fi controller 612 may need to be informed before the time at which a packet is scheduled to be transmitted over the link 640 by the SRWC controller 614. For example, the Wi-Fi controller 612 may expect to be informed at a period of ten milliseconds (ms) before the time at which a packet is scheduled to be transmitted over the link 640 by the SRWC controller 614. Thus, the SRWC controller 614 may schedule a time of transmission for a packet over the link 640, and inform the Wi-Fi controller 612 at a period ten ms before the scheduled transmission time of the packet.

In so doing, the Wi-Fi controller 612 may schedule Wi-Fi communication based on the period (e.g., of ten ms) so that a window is available in advance of the scheduled transmission time of the short-range wireless communications packet and, therefore, the short-range wireless communications packet may be transmitted without delay when arriving at a TX queue. Accordingly, the Wi-Fi controller 612 may arrange relatively lower priority Wi-Fi communications around short-range wireless communications packets, e.g., because the short-range wireless communications packets may be associated with a latency that is relatively lower (i.e., a relatively higher priority) than the Wi-Fi communications. For example, the Wi-Fi controller 612 may set a communication window for Wi-Fi communications based on the time interval determined by the SRWC controller 614, and the Wi-Fi controller 612 may transmit Wi-Fi packets in the communication window. The Wi-Fi controller 612 may adjust the communication window so that Wi-Fi transmissions do not overlap with transmissions over the link 640 by the SRWC controller 614, which may cause Wi-Fi communications to be queued for transmission after short-range wireless communications packets in a TX queue of the source device 602 and/or the Wi-Fi controller 612 may fragment Wi-Fi communications (e.g., so that relatively higher priority fragments of Wi-Fi communications may be queued for transmission before relatively lower priority fragments of Wi-Fi communications that will be transmitted after a set of short-range wireless communications packets).

Correspondingly, the SRWC controller 614 may be informed in advance of a Wi-Fi transmission. For example, the SRWC controller 614 may expect to be informed at a period of ten milliseconds (ms) before the time at which Wi-Fi data is scheduled to be transmitted by the Wi-Fi controller 612. Thus, the SRWC controller 614 may schedule a time of transmission for a packet over the link 640 that does not conflict with the Wi-Fi controller 612.

To coordinate the coexistence between the SRWC controller 614 and the Wi-Fi controller 612, the source device 602 may include a latency controller 610. The latency controller 610 may be implemented as hardware, software, firmware, or a combination thereof. The latency controller 610, the SRWC controller 614, and the Wi-Fi controller 612 may be communicatively coupled with one another over a bus system, such as a serial low-power inter-chip media bus (SLIMbus).

The latency controller 610 may be configured to coordinate the size of packets and time interval between packets with the codec 616, e.g., so that the codec 616 may encode data from one of the applications 608a, 608b with a bitrate that is suitable for both the payload size of short-range wireless communications packets and the time interval between short-range wireless communications packets without unsatisfactory delay in delivery of those short-range wireless communications packets to the sink device 604.

In some aspects, the Wi-Fi controller 612 may provide information to the latency controller 610 associated with the scheduling of Wi-Fi data. For example, the Wi-Fi controller 612 may request that the latency controller 610 cause the time interval between short-range wireless communications packets to be increased so that the Wi-Fi controller 612 may transmit Wi-Fi data.

Thus, in aspects, the latency controller 610 may be configured to determine a time interval between each of a set of packets to be transmitted over the short-range wireless communications link 640. For example, the latency controller 610 may determine the time interval as a number of slots that are to occur between each of a set of packets.

The time interval may relate to the latency of packets sent over the link 640. Thus, the latency controller 610 may determine a relatively longer time interval for a relatively longer latency and, correspondingly, a relatively shorter time interval for a relatively shorter latency. The latency controller 610 may be configured to dynamically determine a time interval, such as when the link 640 is already active. Further, the latency controller 610 may be configured to adjust (e.g., dynamically adjust) the time interval as various condition(s) change.

Further, the latency controller 610 may determine the bitrate at which data is to be encoded by the codec 616 in order to adhere to the determined time interval. The latency controller 610 may further determine the bitrate based on the payload size of the short-range wireless communications packets, which may be predetermined based on the type of the link 640. The latency controller 610 may provide information to the codec 616 indicating the bitrate and/or codec frame size to be encoded by the codec 616.

In some aspects, the size of the packets to be transmitted over the link 640 and/or the modulation scheme used to transmit packets over the link 640 may be configurable. Thus, the latency controller 610 may further determine a packet size and/or modulation scheme based on the determined time interval. For example, in order to configure the packet size, the latency controller 610 may switch from one type of packet (e.g., 2DH3) to another type of packet (e.g., 2DH5) having a different size.

In some aspects, short-range wireless communications over the link 640 may include time-division multiplexing (TDM), e.g., consistent with the structure of a BT link. Thus, a limited number of modulation schemes may be available for sending the set of packets over the link 640 due to the TDM structure of communications over the link 640. This limited number of modulation schemes may correspondingly result in a limited amount of available sizes of packets and, therefore, the latency controller 610 may adjust the packet size based on the available modulation schemes that are compatible with the TDM structure of communications over the link 640.

For example, as the time interval increases (e.g., as latency in sending packets over the link 640 increases), the latency controller 610 may determine that the size of packets generated by the SRWC controller 614 should also increase. Correspondingly, as the time interval decreases (e.g., as latency in sending packets over the link decreases), the latency controller 610 may determine that the size of packets generated by the SRWC controller 614 should also decrease. The latency controller 610 may provide information indicating a packet size to the SRWC controller 614.

In some aspects, the latency controller 610 may provide information indicating the size of packets to the codec 616. Responsively, the codec 616 may encode data into codec frames that correspond to a payload size indicated by the latency controller 610. For example, the codec 616 may attempt to encode data into codec frames of a respective size that at least approximately matches (e.g., within a threshold margin) the payload size of the packets to be sent over the link 640, such as by adjusting a compression ratio applied to data to approximately match the payload size of packets to be sent over the link 640. Thus, the latency controller 610 may cause the codec 616 to avoid generating codec frames that are too large to fit within the payload of a short-range wireless communications packet (e.g., as described with respect to FIGS. 5A and 5B, supra). Similarly, the latency controller 610 may cause the codec 616 to avoid generating codec frames that are so small that a full codec frame and a fractional portion of another codec frame could fit within the payload of the short-range wireless communications packet (e.g., as described with respect to FIGS. 5C and 5D, supra).

The latency controller 610 may determine the time interval between each of the set of packets based on one or more of an RSSI, a channel quality report received from the sink device 604, a number of messages indicating a retransmission request received from the sink device 604 (e.g., a number of negative acknowledgement (NACK) messages received from the sink device 604), and/or a number of retransmission packets transmitted to the second device.

For example, when channel condition(s) associated with the link 640 deteriorate, then the latency controller 610 may be configured to increase the time interval between each of the set of packets to be sent over the link 640. Accordingly, the latency controller 610 may determine the channel condition(s) associated with the link 640. In some aspects, the latency controller 610 may determine that the channel condition(s) associated with the link 640 have deteriorated when the RSSI fails to satisfy (e.g., does not meet or exceed) an RSSI threshold, when a value associated with channel quality of the link 640 indicated in a channel quality report from the sink device 604 fails to satisfy (e.g., does not meet or exceed) a channel quality threshold, when the number of retransmission request messages (e.g., NACK messages) received from the sink device 604 within a first time period satisfies (e.g., meets or exceeds) a retransmission request threshold, and/or when the number of retransmitted packets transmitted to the sink device 604 within a second time period satisfies (e.g., meets or exceeds) a retransmission threshold. Similarly, the latency controller 610 may be configured to decrease the time interval between each of the set of packets to be sent over the link 640 when channel conditions associated with the link 640 improve.

In some aspects, the latency controller 610 may determine the time interval between each of the set of packets based on the one of the applications 608a, 608b providing data to be sent over the link 640. For example, the latency controller 610 may determine a first time interval between each of a first set of packets to be sent over the link 640 based on a first latency parameter associated with the first application 608a (e.g., the first application 608a may rely on low-latency communication over the link 640). When the source device 602 switches from the first application 608a to the second application 608b, the latency controller 610 may determine a second time interval between each of a second set of packets to be sent over the link 640 based on a second latency parameter associated with the second application 608b (e.g., the second application 608b may not have a latency parameter or the second latency parameter may be different from the first). In another example, the latency controller 610 may determine a first time interval between each of a first set of packets to be sent over the link 640 based on a first amount of data provided by the first application 608a. When the source device 602 switches from the first application 608a to the second application 608b, the latency controller 610 may determine a second time interval between each of a second set of packets to be sent over the link 640 based on a second amount of data provided by the second application 608b.

In some aspects, the latency controller 610 may determine the time interval between each of the set of packets based on the short-range wireless communications link 640. For example, the link 640 may have an associated connection interval, such as a BLE connection interval or a human interface device profile (HID) connection interval. The latency controller 610 may detect the connection interval associated with the link 640, and may increase or decrease the time interval between packets to be sent over the link 640 depending upon whether the connection interval increases or decreases.

To synchronize data provided by the source device 602 that is to be output by an output component 624 (e.g., a speaker, a display, etc.) of the sink device 604, the latency controller 610 may implement a TTP function. For example, TTP information may be included in each short-range wireless communications packet in order to indicate a playback time at which the sink device 604 is to cause the output component 624 (e.g., speaker, display, etc.) to output the data included in the payload of that short-range wireless communications packet. For example, the playback time indicated by the TTP information may be referenced to a clock associated with the short-range wireless communications (e.g., a BT clock). Thus, the latency controller 610 may coordinate the data to be transmitted over the link 640 with the output of that data by the output component 624 of the sink device 604, which may reduce latency in the output of that data. The latency controller 610 may be configured to send information to the sink device 604 based on the time interval between short-range wireless communications packets sent over the link 640. This information may indicate a TTP.

As the time interval between a set of packet to be sent over the link 640 is increased or decreased, the latency controller 610 may correspondingly determine that the TTP is to be increased or decreased, respectively. When the latency controller 610 determines that the time interval is to be increased, the latency of the TTP period may be increased at a rate (e.g., for user experience), such as a rate of less than two ms per second. The latency controller 610 may determine that the TTP has sufficient overhead (e.g., 1.25 ms per slot), and then the latency controller 610 may increase the time interval by one time period (e.g., one current TTP period). In other words, the latency controller 610 may increase the TTP first before causing the time interval between packets to be increased. In so doing, the latency controller 610 may inform the codec 616 that the bitrate is to be reduced after increasing the TTP.

When the latency controller 610 determines that the time interval is to be decreased, the latency controller 610 may first decrease the time interval between each of a set of packets to be sent over the link 640. Subsequently, the latency controller 610 may inform the codec 616 that the bitrate is to be increased. After decreasing the time interval between packets sent over the link 640, the latency controller 610 may decrease the TTP at a rate (e.g., for user experience), such as a rate of less than two ms per second.

In some aspects, the latency controller 610 may be configured to cause the SRWC controller 614 to disable or adjust one or more scans based on the determined time interval. For example, when the determined time interval satisfies (e.g., meets or exceeds) a scan threshold, then the latency of the transmission of packets over the link 640 may be relatively longer and, therefore, the latency controller 610 may attempt to reduce latency by causing the SRWC controller 614 to disable and/or adjust one or more of page scans and/or inquiry scans. The SRWC controller 614 may adjust one or more scans by adjusting the length, type, and/or frequency of the one or more scans.

Turning to the sink device 604, the sink device 604 may include a buffer 620 in which to buffer the set of packets received over the link 640. The packets stored in the buffer 620 may be de-queued and provided to a codec 622. The codec 622 may decode the data included in each payload of each of the packets received over the link 640, and the decoded data may be provided to the output component 624.

The output component 624 may be configured to output the decoded data, such as through playback from a speaker and/or display communicatively coupled with the sink device 604. However, the output component 624 may control the output of different data from different payloads of different packets received over the link according to the TTP information indicated in each of the respective packets. For example, if a first packet includes first data and a first TTP, and a second packet includes second data and a second TTP after the first TTP, then the output component 624 may output the first data at the first TTP and then wait until the occurrence of the second TTP before outputting the second data. The TTP may be synchronized with a clock associated with the link 640 (e.g., a BT block), and a clock at the sink device 604 may be synchronized with a corresponding clock at the source device 602.

With reference to FIG. 6B, a call flow 660 illustrates short-range wireless communication between the source device 602 and the sink device 604, in accordance with various aspects of the present disclosure. Initially, the source device 602 and the sink device 604 may establish a short-range wireless communications link 640. For example, the source device 602 and the sink device may establish the link 640 using at least one page scan or at least one inquiry scan. The link 640 may include any suitable link for short-range wireless communications. Examples of the link 640 may include an A2DP link, a BLE link, an eSCO link, an ACL link, an ISO link, an HID link, or another link associated with short-range wireless communications.

With the link 640 established, the source device 602 (e.g., the latency controller 610) may determine 662 one or more conditions associated with sending a set of packets 672 over the link 640 to the sink device 604. For example, as described herein, the one or more conditions associated with sending a set of packets 672 over the link 640 may include one or more channel conditions associated with the link 640. The source device 602 (e.g., the latency controller 610) may determine the one or more channel conditions based on one or more of an RSSI, a channel quality report received from the sink device 604, a number of messages indicating a retransmission request received from the sink device 604 (e.g., a number of NACK messages received from the sink device within a first predetermined time period), a number of retransmission packets transmitted to the sink device 604 (e.g., a number of packets transmitted within a second predetermined time period having a payload that is a retransmission of a previously sent payload), another type of message received from the sink device 604 indicating channel quality/interference on the link 640, another type of measurement indicative of channel quality/interference on the link 640, etc.

According to another example, as described herein, the source device 602 (e.g., the latency controller 610) may determine 662 one or more conditions associated with sending a set of packets 672 over the link 640 based on one of the applications 608*a*, 608*b* providing data to be sent over the link 640, such as latency parameter(s) and/or quality of service (QoS) parameter(s) indicated by the one of the applications 608*a*, 608*b*. For example, the one of the applications 608*a*, 608*b* may indicate that data to be sent over the link 640 is associated with low latency and/or a relatively high priority QoS (e.g., a higher priority relative to Wi-Fi communications and/or other short-range wireless communications).

In one configuration, at least one QoS parameter may be indicated by an application that is "in focus"—e.g., an "in focus" application may be an application that is in the foreground and/or an application that is communicating over the link 640. The source device 602 (e.g., the latency controller 610) may determine the condition as the at least one QoS parameter of an application that is in focus.

In yet another example, the source device 602 (e.g., the latency controller 610) may determine 662 one or more conditions associated with sending a set of packets 672 over the link 640 based on the short-range wireless communications link 640. For example, the source device 602 (e.g., the latency controller 610) may determine a condition associated with sending a set of packets 672 over the link 640 based on a connection interval associated with the link 640.

In still another example, the source device 602 (e.g., the latency controller 610) may determine 662 one or more conditions associated with sending a set of packets 672 over the link 640 based on Wi-Fi communications by the source device 602 (e.g., Wi-Fi communications scheduled by the Wi-Fi controller 612). For example, the source device 602 (e.g., the Wi-Fi controller 612) may determine that Wi-Fi communications by the source device 602 needs additional time during short-range wireless communications over the link 640. Thus, a condition associated with sending a set of packets 672 over the link 640 the source device 602 (e.g., the latency controller 610) may determine a condition associated with sending a set of packets 672 over the link 640 includes additional time commensurate with scheduling Wi-Fi communications by the source device 602.

The source device 602 (e.g., the latency controller 610) may determine 664 a time interval 674 between each of a set of packets 672 to be sent over the established link 640. In other words, the time interval 674 occurring between transmission of one packet (e.g., the first packet 672*a*) over the link 640 and transmission of the next packet (e.g., the second packet 672*b*) over the link 640 may be configurable, and the source device 602 may configure this time interval 674.

The source device 602 may determine 664 the time interval 674 based on the determination 662 of the one or more conditions associated with sending a set of packets 672 over the link 640. Thus, the source device 602 may determine 664 the time interval 674 is to be increased or decreased commensurate with one or more channel conditions, latency/QoS parameters indicated by one of the applications 608a, 608b, a connection interval associated with the link 640, whether Wi-Fi communications by the source device 602 is to be scheduled while packets are to be sent over the link 640, etc.

According to an example, the first application 608a may be an audio and/or video playback application (e.g., a streaming music application, streaming video application, etc.). One or more QoS parameters associated with the first application 608a may indicate link efficiency is to be improved and/or bandwidth is to be increased. According to such QoS parameters, when the first application 608a is in focus, the time interval 674 may be relatively larger (e.g., increased from a previous time interval). In another example, the second application 608b may have different QoS parameters than the first application 608a (e.g., the second application 608b may be a game or another application that responds to user input to generate audio). When the second application 608b is in focus, the QoS parameters may indicate latency is to be reduced. According to such QoS parameters, when the second application 608b is in focus, the time interval 674 may be relatively shorter (e.g., decreased from a previous time interval).

Additionally, the source device 602 may coordinate the determined time interval 674 for coexistence with Wi-Fi communications by the source device 602. Referring to FIG. 6A, the latency controller 610 may indicate the determined time interval 674 to the Wi-Fi controller 612 before causing the determined time interval 674 to occur between each of the set of packets 672. For example, the latency controller 610 may inform the Wi-Fi controller 612 about the determined time interval 674 by a first time period (e.g., ten ms) before implementing the determined time interval 674 between each of the set of packets 672. Still referring to FIG. 6A, the latency controller 610 may indicate the determined time interval 674 to the SRWC controller 614 before causing the determined time interval 674 to occur between each of the set of packets 672. For example, the latency controller 610 may inform the SRWC controller 614 about the determined time interval 674 by a second time period (e.g., ten ms) before implementing the determined time interval 674 between each of the set of packets 672.

In some aspects, the source device 602 (e.g., the latency controller 610) may dynamically configure the time interval 674. For example, the source device 602 may determine 664 the time interval 674 while the link 640 is active and/or while the source device 602 is transmitting (e.g., streaming) data over the link 640. Therefore, the source device 602 may be configured to responsively adjust the time interval 674 as one or more conditions change and packets are continuously sent over the link 640 (e.g., without interruption and/or establishment of a new short-range wireless communications link).

Based on the determination 664 of the time interval 674, the source device 602 (e.g., the latency controller 610) may configure 666 page scans and/or inquiry scans. For example, when the latency experienced in sending packets over the link 640 increases (e.g., satisfies a latency threshold) and, correspondingly, the time interval 674 between each of the set of packets to be sent over the link 640 increases (e.g., satisfies a scan threshold), then the source device 602 may configure 666 page scans and/or inquiry scans by the source device 602 and/or, potentially, the sink device 604. In one aspect, the source device 602 may configure 666 the at least one of the page scans and/or the inquiry scans by disabling the at least one of the page scans and/or the inquiry scans. In another aspect, the source device 602 may configure 666 the at least one of the page scans and/or the inquiry scans by configuring a length, type, and/or number of the at least one of the page scans and/or the inquiry scans.

Further, the source device 602 may encode 668 data with a bitrate based on the determination 664 of the time interval 674. Referring to FIG. 6A, e.g., when the latency controller 610 determines the time interval 674, the latency controller 610 may indicate, to the codec 616, that data to be sent over the link 640 is to be encoded with a bitrate that is based on the determined time interval 674. For example, when the latency experienced in sending packets over the link 640 increases (e.g., satisfies a first latency threshold) and, correspondingly, the time interval 674 between each of the set of packets to be sent over the link 640 increases (e.g., satisfies a first bitrate threshold), then the source device 602 may encode 668 data with a bitrate that is relatively lower. Similarly, when the latency experienced in sending packets over the link 640 decreases (e.g., fails to satisfy the first latency threshold or satisfies a second latency threshold) and, correspondingly, the time interval 674 between each of the set of packets to be sent over the link 640 decreases (e.g., fails to satisfy the first bitrate threshold and/or satisfies a second bitrate threshold), then the source device 602 may encode 668 data with a bitrate that is relatively higher.

In some aspects, the source device 602 (e.g., the codec 616) may encode 668 data based on a size of each of the set of packets 672 (e.g., as indicated by the latency controller 610). For example, the source device 602 may encode 668 data into codec frames, each of which may approximately correspond to a payload size of each of the set of packets 672 to be sent over the link 640 (e.g., within a threshold margin).

The source device 602 (e.g., the codec 616) may generate codec frames including data encoded with the bitrate that is based on the determined time interval 674. The source device 602 (e.g., the SRWC controller 614) may packetize 670 the encoded data (e.g., packetize the generated codec frames). The source device 602 (e.g., the SRWC controller 614) may packetize 670 the encoded data by inserting each generated codec frame into each payload of each of a set of packets 672. In some aspects, the payload size of each of the set of packets 672 may be determined by the source device 602 (e.g., by the latency controller 610) based on the determined time interval 674.

For example, the source device 602 (e.g., the latency controller 610) may increase the size of each of the set of packets 672 when the latency experienced in sending packets over the link 640 increases (e.g., satisfies the first latency threshold) and, correspondingly, the time interval 674 between each of the set of packets to be sent over the link 640 increases (e.g., satisfies a first packetizing threshold). Similarly, the source device 602 (e.g., the latency controller 610) may decrease the size of each of the set of packets 672 when the latency experienced in sending packets over the link 640 decreases (e.g., fails to satisfy the first latency threshold or satisfies the second latency threshold) and, correspondingly, the time interval 674 between each of the set of packets to be sent over the link 640 decreases (e.g., fails to satisfy the first packetizing threshold or satisfies a second packetizing threshold).

Similar to the time interval 674, the size of each of the set of packets 672 may be based on one or more QoS parameters, such as QoS parameters of an application that is in focus. According to an example, the first application 608a may be an audio and/or video playback application (e.g., a streaming music application, streaming video application, etc.). One or more QoS parameters associated with the first application 608*a* may indicate link efficiency is to be improved and/or bandwidth is to be increased, and when the first application 608*a* is in focus, the size of each of the set of packets 672 may be relatively larger (e.g., increased from a previous packet size). In another example, the second application 608*b* may have different QoS parameters than the first application 608*a* (e.g., the second application 608*b* may be a game or another application that responds to user input to generate audio). When the second application 608*b* is in focus, the QoS parameters may indicate latency is to be reduced and, therefore, the size of each of the set of packets 672 may be relatively smaller (e.g., decreased from a previous packet size).

When the encoded data is packetized, the source device 602 (e.g., the SRWC controller 614) may schedule each of the set of packets 672, e.g., by inserting each of the set of packets into a TX queue. The source device 602 may schedule each of the set of packets 672 based on scheduling information associated with Wi-Fi communications by the source device (e.g., scheduling information provided by the Wi-Fi controller 612). Further, the source device may schedule Wi-Fi communications based on the scheduling of the set of packets 672. For example, referring to FIG. 6A, the SRWC controller 614 may inform the Wi-Fi controller 612 of a respective slot of at least the first packet 672*a* of the set of packets 672 so that the Wi-Fi controller 612 may schedule Wi-Fi communications based on the respective slot(s) and/or so that the Wi-Fi controller 612 may request additional time for Wi-Fi communications from the latency controller 610.

The source device 602 may further schedule each of the set of packets 672 based on the determined time interval 674. Referring to FIG. 6A, the latency controller 610 may inform the SRWC controller 614 of the determined time interval 674 before the determined time interval 674 is to be implemented between each of the set of packets 672. That is, the latency controller 610 may inform the SRWC controller 614 of the determined time interval 674 by a time period (e.g., ten ms) before implementing the determined time interval 674 between each of the set of packets 672 so that the SRWC controller 614 is able to schedule a respective slot for each of the set of packets 672 according to the determined time interval 674.

When the source device 602 packetizes 670 the encoded data in each of the set of packets 672, the source device 602 may include information indicating a TTP. The source device 602 may include the information indicating the TTP in a header of the packet (see, e.g., FIG. 7, infra). The information indicating the TTP may be referenced to a clock (e.g., a BT clock) that may be synchronized between the source device 602 and the sink device 604, and the information indicating the TTP may in each of the set of packets 672 may indicate a respective time corresponding to the clock at which the sink device 604 is to output the respective data encoded in a respective payload of each of the set of packets 672.

Having packetized encoded data, the source device 602 may transmit the first packet 672*a* of the set of packets 672 (e.g., in a respective slot scheduled by the SRWC controller 614). As aforementioned, the first packet 672*a* may include information indicating a TTP associated with the data included in the payload of the first packet 672*a*. Accordingly, when the sink device 604 receives the first packet 672*a*, the sink device 604 may output the data according to the information indicating the TTP included in the first packet 672*a*.

Referring to FIG. 6A, when the sink device 604 receives the first packet 672*a*, the sink device 604 may store the first packet 672*a* in the buffer 620. The codec 622 of the sink device 604 may retrieve the first packet 672*a* from the buffer 620 and may decode the encoded data included in the payload of the first packet 672*a* according to the bitrate with which the source device 602 encoded each of the set of packets 672. The output component 624 of the sink device 604 may then output the decoded data according to the information indicating the TTP included in the first packet 672*a*.

The source device 602 (e.g., the SRWC controller 614) may transmit the second packet 672*b*, which the source device 602 scheduled to be transmitted over the link 640 after the determined time interval 674. As with the first packet 672*a*, the sink device 604 may receive the second packet 672*b*, buffer the second packet 672*b*, decoded the encoded data included in the payload of the second packet 672*b*, and output the decoded data consistent with the information indicating the TTP included in the second packet 672*b*.

The source device 602 may continuously transmit each of the set of packets 672, each of which may be scheduled for transmission over the link 640 according to the determined time interval 674 so that each of the set of packets 672 may be scheduled to be separated by the determined transmission time when transmitted over the link 640.

During transmission of the set of packets 672, the source device 602 may determine 662 one or more conditions associated with transmission of the set of packets 672 over the link 640. When the source device 602 determines that one or more conditions associated with transmission of the set of packets 672 over the link 640 has sufficiently changed so as to merit a reconfiguration of the timer interval, the source device 602 may (dynamically) determine 664 a new time interval based on the one or more conditions associated with transmission of the set of packets 672 over the link 640. Accordingly, after transmitting the $n^{th}$ packet 672*n*, the source device 602 may reconfigure the time interval 674 to the new time interval, which may be longer or shorter than the first time interval 674.

The source device 602 may then configure 666 page and/or inquiry scans, encode 668 data with a new bitrate based on the new time interval, and packetize 670 the newly encoded data based on the new time interval (e.g., when the packet size has changed based on the new time interval). The source device 602 may then schedule the next set of packets to be transmitted over the link 640 so that each of the next set of packets may be separated by the new time interval and, further, each of the next set of packets may include information indicating a TTP based on the new time interval. Thus, the source device 602 may (dynamically) configure the time interval responsive to conditions associated with sending packets over the link 640 in order to provide a low-latency, high-quality, and reliable data stream to a user of the sink device 604.

Figure 7:
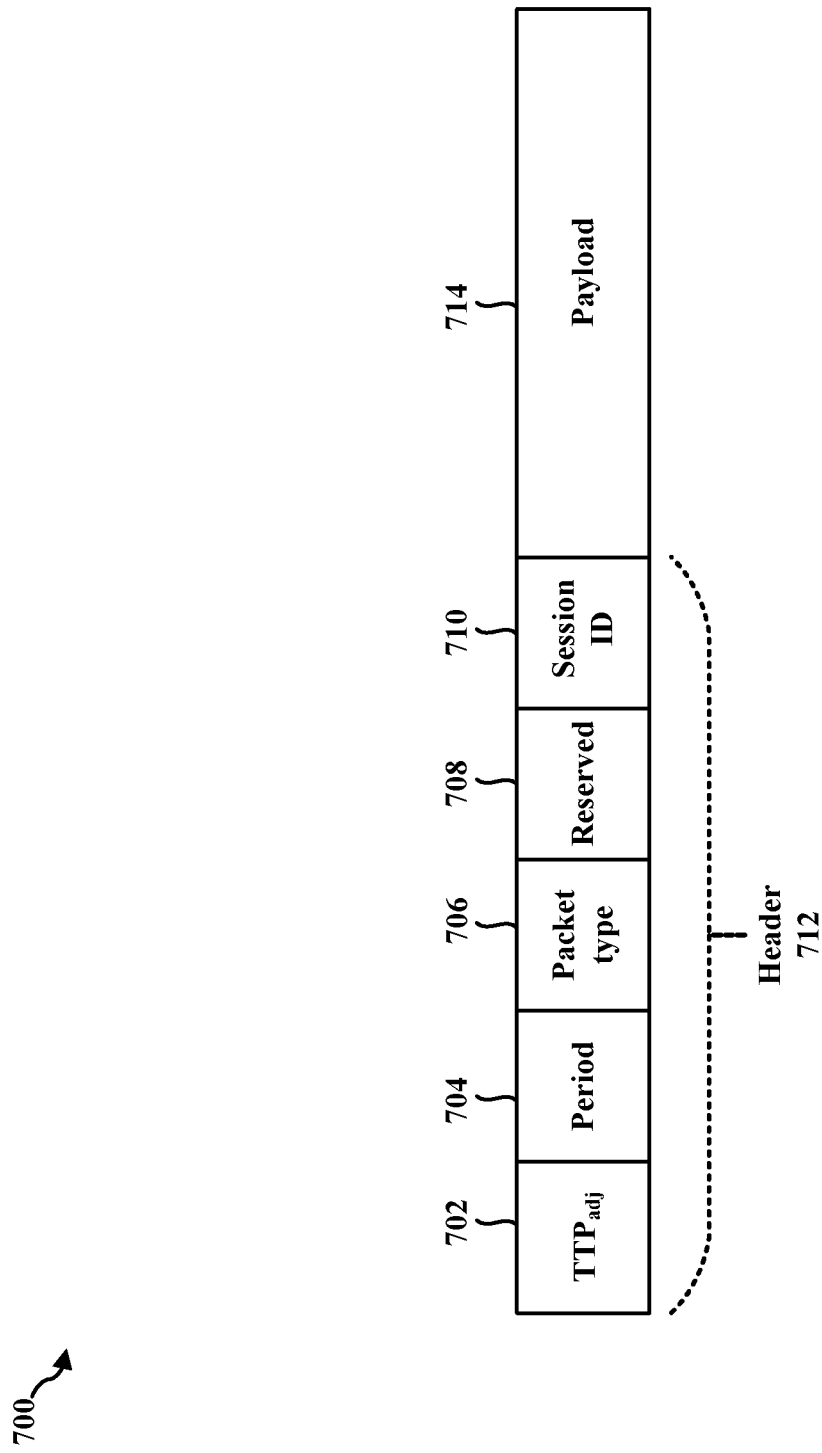
FIG. 7 is a diagram illustrating a data packet carrying audio, in accordance with certain aspects of the disclosure.

With reference to FIG. 7, a block diagram illustrates a packet 700 to be communicated over a short-range wireless communications link, in accordance with various aspects of the present disclosure. The packet 700 may be a respective one of the set of packets 672 described with respect to FIGS. 6A and 6B, and therefore various aspects of the packet 700 may be described in the context of FIGS. 6A and 6B. The packet 700 may be included in one of the data packet 400 or the data packet 450 described with respect to FIGS. 4A and 4B, respectively.

The packet 700 may include a header 712 and a payload 714. First with respect to the payload 714, the payload 714 may include the data to encoded by a transmitting device (e.g., the source device 602). For example, the payload 714 may include audio data, video data, human interface device data (e.g., for an input device, such as a mouse or keyboard), or any other data suitable to be communicated over a short-range wireless communications link. In some aspects, the data included in the payload 714 may be compressed.

With respect to the header 712, the header 712 may include a set of fields. The set of fields may include, inter alia, a TTP field 702, a period field 704, a packet type field 706, a reserved field 708, and a session identifier (ID) field 710.

The TTP field 702 may include information indicating a TTP corresponding to the data included in the payload. The TTP information included in the TTP field 702 may indicate a time at which the data included in the payload 714 is to be output by the receiving device (e.g., the sink device 604). The TTP information may be referenced to a clock that is synchronized between the transmitting device (e.g., the source device 602) and the receiving device (e.g., the sink device 604).

In some aspects, the TTP information may be an offset (e.g., from a current time), rather than an absolute time. For example, the TTP field 702 may be a configured for a two-byte signed number $TTP_{adj}$ to be used to adjust the $TTP_{timestamp}$, where the $TTP_{timestamp}$ is the time at which the data included in the payload 714 is to be output. Referring again to FIGS. 6A and 6B, because the source device 602 (e.g., the latency controller 610) may cause different data included in payloads of packets sent over the link 640 to be encoded with different bitrates (and thus, for example, different amounts of compressed data, such as compressed audio), the $TTP_{adj}$ may indicate an adjustment to be applied to compensate for the variations in bitrate (and amount of compressed data) in packets sent over the link 640. The source device 602 (e.g., the latency controller 610) may calculate the $TTP_{timestamp}$ as $BT_{clock}+TTP_{adj}$, where $BT_{clock}$ is the clock synchronized between the source device 602 and the sink device 604 (e.g., a BT clock). In one aspect, the source device 602 (e.g., the latency controller 610) may calculate the $TTP_{adj}$ in units of microseconds (μs) or multiples of μs (e.g., four μs).

The period field 704 may include information indicating the time period between packets. In some aspects, the period field 704 may indicate the time period as a number of slots between packets (e.g., a number of consecutive slots). For example, the source device 602 may include information in the period field 704 based on the determined time interval 674. Referring to FIG. 6B, the first packet 672a may include the period field 704 in order to indicate a time period between the first packet 672a and the second packet 672b.

The packet type field 706 may indicate the type of the packet 700. For example, the packet type field 706 may indicate the type of packet according to the type of the short-range wireless communications link (e.g., the link 640). Examples of the type of packet that may be indicated in the packet type field 706 include, inter alia, DH1, DH3, DH5, DM1, DM3, DM5, AUX1, HV1, HV2, HV3, NULL, POLL, and ID. Different types of short-range wireless communications links may use different packet types and, therefore, the packet type field 706 may correspond to the type of the short-range wireless communications link over which the packet 700 is transmitted.

The reserved field 708 may be reserved for specific types of information, e.g., based on different protocols and/or standards. In some aspects, the reserved field 708 may be empty or include a null value.

The session ID field 710 may indicate an ID associated with a communication session. For example, when the source device 602 and the sink device 604 establish the short-range wireless communications link 640, a session ID may be allocated. This session ID may be included in the session ID field 710 to indicate that the packet 700 is intended for the link 640, and is one of a sequence of packets communicated over the link 640.

Figure 8:
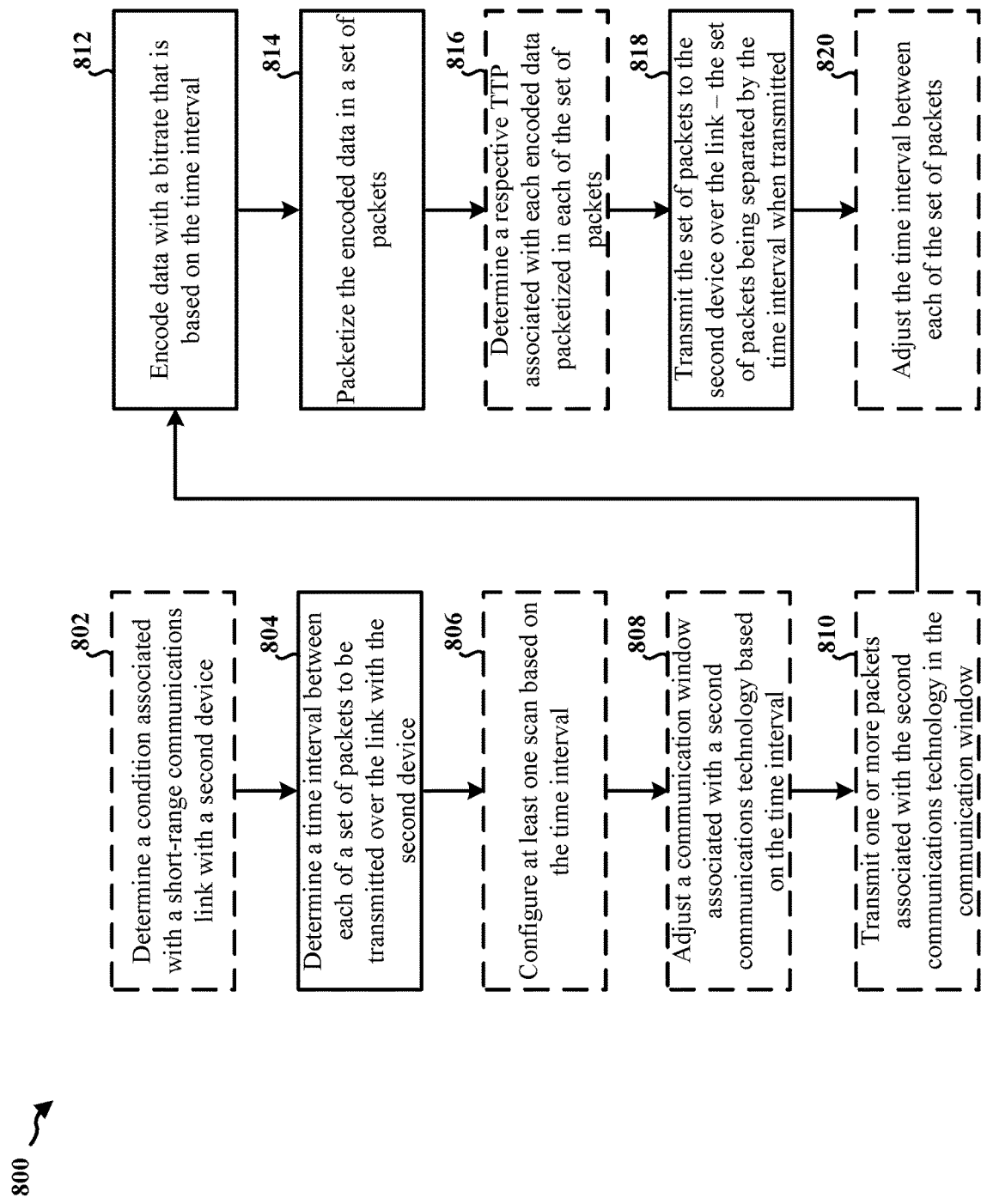
FIG. 8 is a flowchart of a method of wireless communication, in accordance with certain aspects of the disclosure.

With reference to FIG. 8, a flowchart illustrates a method 800 of wireless communication, in accordance with various aspects of the present disclosure. The method 800 may be performed by a first device (e.g., the wireless device 102, a peripheral device 104, 106, 108, 110, 112, 114, the wireless device 200, the source device 602, the apparatus 902/902', etc.) in communication with a second device (e.g., the wireless device 102, a peripheral device 104, 106, 108, 110, 112, 114, the wireless device 200, the sink device 604, the second device 950). In different aspects, one or more illustrated operations may be omitted, transposed, and/or contemporaneously performed.

Beginning with operation 802, the first device may determine a condition associated with a short-range wireless communications link with a second device. For example, the first device may establish the short-range wireless communications link with the second device. Next, the first device may determine one or more conditions associated with transmission of a set of packets over the established short-range wireless communications link.

For example, referring to FIGS. 6A and 6B, the source device 602 (e.g., the SRWC controller 614) may establish the short-range wireless communications link 640 with the sink device 604, such as by "pairing" with the sink device 604. Next, the source device 602 (e.g., the latency controller 610) may determine 662 one or more conditions associated with transmission of a set of packets over the link 640—e.g., by determining one or more channel condition(s) associated with the link 640, by determining parameters (e.g., latency, QoS, etc.) associated with the one of the applications 608a, 608b providing data to be transmitted over the link 640, by determining a connection interval associated with the type of the link 640, etc.

In one aspect, the first device may detect one or more channel conditions associated with the short-range wireless communications link. For example, the one or more channel conditions may be based on at least one of an RSSI, a channel quality report received from the second device, a number of messages indicating a retransmission request received from the second device (e.g., a number of NACK messages received from the second device within a first time period), and/or a number of retransmission packets transmitted to the second device (e.g., a number of packets transmitted within a second time period that include a payload that is a retransmission of an earlier payload).

In one example, the first device may determine a channel condition associated with the link based on comparison of an RSSI to an RSSI threshold. In another example, the first device may determine a channel condition associated with the link based on comparison of a channel quality value to a channel quality threshold, and the channel quality value may be indicated in a channel quality report from the second device. In another example, the first device may determine a channel condition associated with the link based on comparison of a number of retransmission request messages (e.g., NACK messages) received from the second device within a first time period to a retransmission request threshold. In another example, the first device may determine a channel condition associated with the link based on comparison of a number of retransmitted packets transmitted to the second device within a second time period to a retransmission threshold.

In a further example, the first device may determine a condition associated with the link based on an application of the first device that provides data to be sent over the link. For example, the first device may identify the application providing data to be sent over the link and, next, the first device may detect a latency parameter and/or a QoS parameter associated with the identified application.

In yet another example, the first device may determine a condition associated with the link based on the short-range wireless communications link. For example, the first device may determine the type of the short-range wireless communications link and, next, the first device may detect a connection interval associated with the type of the short-range wireless communications link, such as a BLE connection interval or a HID connection interval.

In still another example, the first device may determine a condition associated with the link based on a second communications technology of the first device, which may cause other communication that is contemporaneous with the transmission of packets over the short-range wireless communications link. The second communications technology may be Wi-Fi, Wi-Fi Direct, 5G NR, LTE, LTE-A, or another wireless/radio access technology. For example, the first device may determine that the Wi-Fi communications needs a minimum effective bandwidth and/or an allocated amount of time for Wi-Fi communications in which transmission over the short-range wireless communications link is suspended and, next, the first device may schedule Wi-Fi communications based on the minimum effective bandwidth and/or allocated amount of time.

At operation 804, the first device may determine a time interval between each of a set of packets to be transmitted over a short-range wireless communications link with a second device. According to one aspect, the first device may determine the time interval as a number of slots or other time structures associated with the link 640. The first device may determine the time interval between each of the set of packets based on one or more of the conditions associated with transmission of the set of packets over the short-range wireless communications link (as determined at operation 802, supra). For example, the first device may identify at least one condition associated with transmission of the set of packets over the short-range wireless communications link and, next, the first device may configure a time interval between each of a set of packets to be transmitted over a short-range wireless communications link based on the identified at least one condition.

For example, referring to FIGS. 6A and 6B, the source device 602 (e.g., the latency controller 610) may determine 664 the time interval 674 that is to occur between each of the set of packets 672. The source device 602 (e.g., the latency controller 610) may determine 664 the time interval 674 based on the determination 662 of the one or more conditions associated with transmission of the set of packets 672 over the link 640.

At operation 806, the first device may configure at least one type of scanning based on the determined time interval. In various aspects, the at least one type of scanning may include page scanning and/or one or more inquiry scanning and/or the at least one type of scanning may be associated with link management or discovery. For example, the first device may compare the determined time interval to a threshold, which may be indicative of the latency associated with transmission of packets over the link (e.g., a relatively shorter time interval may correspond to a relatively lower latency and a relatively longer time interval may correspond to a relatively higher latency). Based on comparison of the determined time interval to the threshold (e.g., if the determined time interval fails to satisfy the threshold), the first device may configure page scans and/or inquiry scans. For example, the first device may attempt to reduce latency by configuring page scans and/or inquiry scans to be disabled. Thus, when the first device determines a relatively longer time interval (e.g., indicating a relatively higher latency), the first device may configure page scans and inquiry scans to be disabled. In another example, the first device may configure the length, type, and/or periodicity of page scans and/or inquiry scans based on the determined time interval.

For example, referring to FIGS. 6A and 6B, the source device 602 (e.g., the latency controller 610) may configure 666 at least one of page scans and/or inquiry scans based on the determination 664 of the time interval 674. For example, the source device 602 (e.g., the latency controller 610) determines that the determined time interval 674 fails to satisfy a threshold (e.g., the latency associated with transmission of packets over the link 640 is relatively high), then the source device 602 may configure 666 at least one of page scans and/or inquiry scans to be disabled.

At operation 808, the first device may adjust a communication window associated with the second communications technology based on the time interval. For example, the first device may set a communication window in which the first device is to transmit Wi-Fi packets. When the first device determines the time interval between each of a set of packets to be transmitted over the short-range wireless communications link to the second device, the first device may determine that the communication window may at least partially overlap with the transmission of the set of packets over the short-range wireless communications link to the second device. In response, the first device may schedule the communication window so that transmission of Wi-Fi packets does not overlap with transmission of the set of packets over the short-range wireless communications link to the second device.

For example, referring to FIGS. 6A and 6B, the source device 602 (e.g., the latency controller 610) may determine 664 the time interval 674 that is to occur between each of the set of packets 672, and the source device 602 (e.g., Wi-Fi controller 612) may schedule Wi-Fi communication based on the time interval 674. Illustratively, the latency controller 610 may inform the Wi-Fi controller 612 of the time interval 674, e.g., 10 ms before the time interval 674 is changed for transmission of the set of packets 672. In response, the Wi-Fi controller 612 may schedule Wi-Fi packets based on the time interval 674, such as by adjusting a communication window during which the Wi-Fi controller 612 may transmit Wi-Fi packets.

At operation 810, the first device may transmit one or more packets associated with the second communications technology in the communication window. For example, for Wi-Fi coexistence, the first device may transmit one or more Wi-Fi packets in a Wi-Fi communication window that does not overlap with transmissions over the short-range wireless communications link to the second device.

For example, referring to FIGS. 6A and 6B, the source device 602 (e.g., Wi-Fi controller 612) may schedule Wi-Fi transmissions to occur during the Wi-Fi communication window. Accordingly, the Wi-Fi controller 612 may transmit Wi-Fi packets in the Wi-Fi communication window.

At operation 812, the first device may encode data with a bitrate that is based on the time interval. For example, the first device may identify data that is to be transmitted over the short-range wireless communications link, such as by identifying data provided by an application (e.g., an application that is in focus at the first device). Next, the first device may determine a bitrate with which to encode the data so that the encoded data is compressed to approximately match the size of the payload of the packets to be transmitted over the link. Further, the first device may encode the identified data with the determined bitrate, and the first device may generate a set of codec frames that include the encoded data.

For example, referring to FIGS. 6A and 6B, the source device 602 (e.g., the codec 616) may encode 668 data provided by one of the applications 608a, 608b based on the determination 664 of the time interval 674. For example, the source device 602 (e.g., the latency controller 610) may determine a bitrate with which to encode data based on the packet size to be transmitted over the link 640 and based on the determination 664 of the time interval 674. The source device 602 (e.g., the codec 616) may then apply the determined bitrate to the data in order to compress the data to approximately match the size of the payload of each of the set of packets 672.

At operation 814, the first device may packetize the encoded data in the set of packets. For example, the first device may generate each of a set of packets, and the first device may insert each of the generated codec frames in each of the payloads of each of the set of packets. Further, the first device may include information in a respective header of each of the set of packets, including a period, a session ID, and a packet type.

For example, referring to FIGS. 6A and 6B, the source device 602 (e.g., the SRWC controller 614) may packetize 670 the encoded data (e.g., provided by the codec 616) in each of the set of packets 672. Referring to FIG. 7, encoded data (e.g., a codec frame) may be packetized into the payload 714, and the header may be populated based on the type of packet, the period between packets (e.g., based on the determined time interval), and a session ID.

At operation 816, the first device may determine a respective TTP associated with each encoded data (e.g., each codec frame) packetized in each of the set of packets. For example, the first device may determine a time at which each encoded data would be output by the second device absent the time interval occurring between each of the set of packets (e.g., assuming each packet was transmitted in consecutive slots), and the determined time may be referenced to a clock synchronized between the first device and the second device. Next, the first device may calculate a respective TTP for each encoded data as an offset value (e.g., a two-byte signed number) to be applied to the determined time at which each encoded data would be output by the second device absent the time interval. For example, each respective TTP may be calculated to compensate at least for the time interval (although the TTP may also compensate for other latency factors, such as over-the-air transmission time). The first device may then include a respective TTP associated with each encoded data in a header of a corresponding packet in which the encoded data is packetized.

For example, referring to FIGS. 6A and 6B, the source device 602 (e.g., the latency controller 610) may determine a respective TTP for each encoded data (e.g., each codec frame) that is packetized 670. The source device 602 (e.g., the latency controller 610 and/or the SRWC controller 614) may include the respective TTP for each encoded data in a header of each of the set of packets 672. Referring to FIG. 7, the respective TTP for each encoded data may be included in the TTP field 702 in the header 712 of the packet 700.

At operation 818, the first device may transmit the set of packets to the second device over the short-range wireless communications link, and each of the set of packets may be separated by the determined time interval when transmitted. For example, the first device may schedule a first packet of the set of packets to be transmitted in a first slot, and the first device may schedule a second packet of the set of packets to be transmitted in a second slot that occurs a number of slots corresponding to the determined time interval after the first slot. The first device may then transmit the first packet in the scheduled first slot, wait the number of slots corresponding to the determined time interval, and then transmit the second packet in the scheduled second slot.

For example, referring to FIGS. 6A and 6B, the source device 602 (e.g., the SRWC controller 614) may schedule the first packet 672a in a first slot and schedule the second packet 672b in a second (non-consecutive) slot that occurs a number of slots corresponding to the determined time interval 674 after the first slot. The source device 602 may then transmit the first packet 672a in the scheduled first slot and, later, transmit the second packet 672b in the second (non-consecutive) slot.

At operation 820, the first device may adjust the time interval between each of the set of packets. For example, the first device may determine that one or more conditions associated with transmission of packets over the short-range wireless communications link has changed (e.g., as described with respect to operation 802, supra). Next, the first device may adjust the time interval between each of the set of packets based on the changed one or more conditions associated with transmission of packets over the short-range wireless communications link. The first device may then proceed to encode data with a different bitrate based on the adjusted time interval (see, e.g., operation 812, supra), packetize the encoded data in a next set of packets (see, e.g., operation 814, supra), determine a respective TTP associated with each differently encoded data and insert the respective TTP in a header of a respective corresponding next packet (see, e.g., operation 816, supra), and transmit each of the next set of packets to the second device over the short-range wireless communications link (see, e.g., operation 818, supra). Optionally, the first device may configure one of page scans and/or inquiry scans based on the adjusted time interval (see, e.g., operation 806, supra). Accordingly, the first device may (dynamically) configure a time interval responsive to conditions associated with sending packets over a short-range wireless communications link in order to provide a low-latency, high-quality, and reliable data stream to a user of the second device.

According one configuration, the time interval may be adjusted based on one or more QoS parameters of an application when that application comes into focus. For example, the time interval may be adjusted when an application is brought to the foreground and/or when an application begins communication over the short-range wireless communications link. In a further configuration, the packet size may be adjusted when the application comes into focus based on the one or more QoS parameters, e.g., in connection with the adjustment of the time interval. According to one example, a first application may come into focus that is an audio and/or video playback application (e.g., a streaming music application, streaming video application, etc.). One or more QoS parameters associated with the first application may indicate link efficiency is to be improved and/or bandwidth is to be increased, and when the first application comes into focus, the time interval may be increased (e.g., over the time interval determined at operation 804) and/or the size of each of a set of packets may be increased (e.g., increased from a previous packet size). In another example, a second application may have different QoS parameters than the first application (e.g., the second application may be a game or another application that responds to user input to generate audio). When the second application comes into focus, the QoS parameters may indicate latency is to be reduced and, therefore, the time interval may be decreased (e.g., from the time interval determined at operation 804) and/or the size of each of a set of packets may be relatively reduced (e.g., decreased from a previous packet size).

For example, referring to FIGS. 6A and 6B, the source device 602 (e.g., the latency controller 610) may determine 664 one or more conditions associated with transmission of the set of packets 672 over the link 640 has changed. Thus, the source device 602 (e.g., the latency controller 610) may determine 664 an adjusted time interval that is to occur between each of the set of packets 672 to be transmitted over the link 640.

Figure 9:
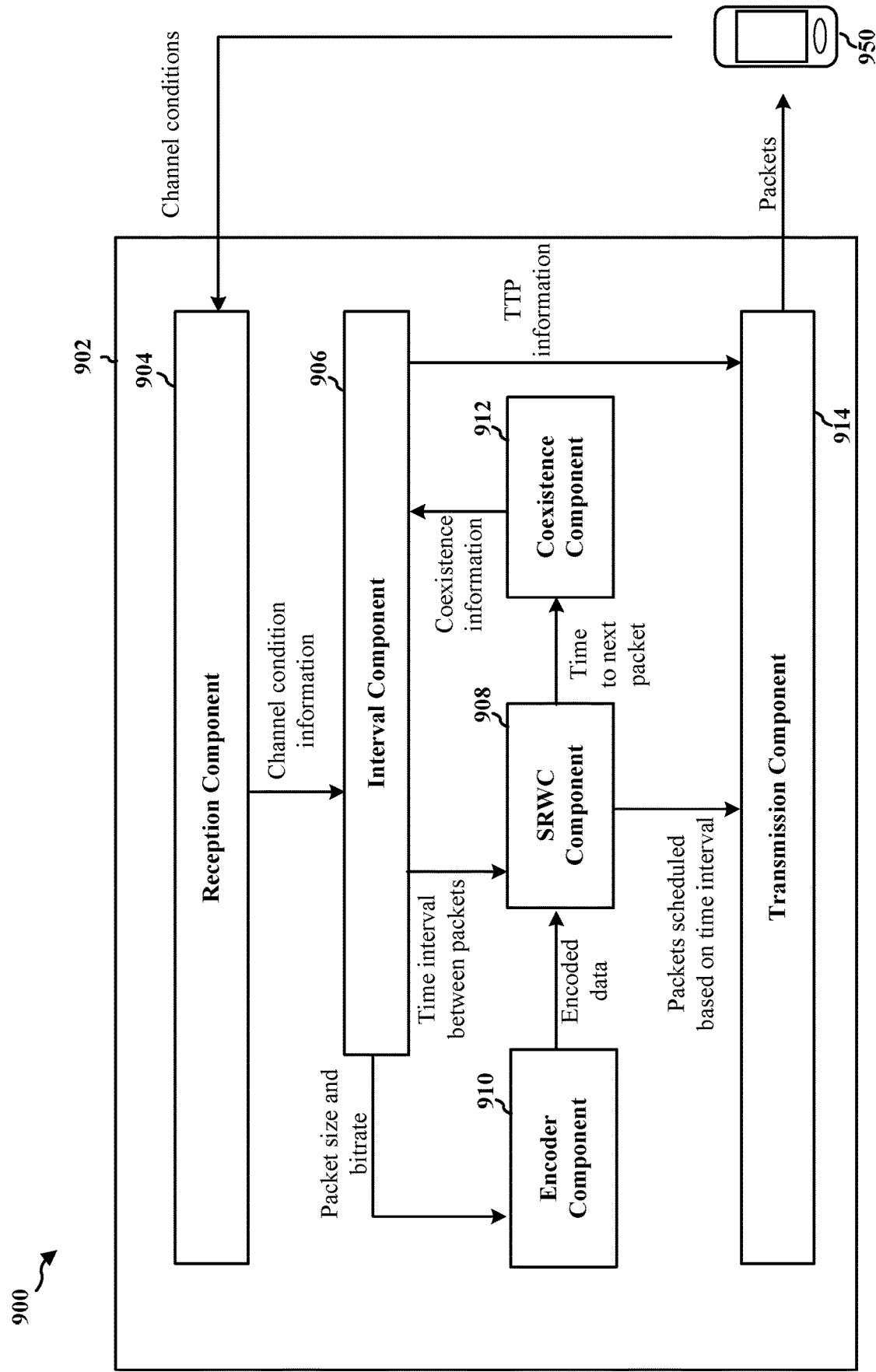
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a first device (e.g., the wireless device 102, a peripheral device 104, 106, 108, 110, 112, 114, the wireless device 200, the source device 602) in communication with a second device 950 (e.g., the wireless device 102, a peripheral device 104, 106, 108, 110, 112, 114, the wireless device 200, the sink device 604).

The apparatus 902 may include a reception component 904 that may be configured to receive signals from a second device 950 over a short-range wireless communications link. Further, the apparatus 902 may include a transmission component 914 configured to transmit signals to the second device 950 over the short-range wireless communications link.

The apparatus 902 may include a SRWC component 908. The SRWC component 908 may establish, with the second device 950, a short-range wireless communications link. For example, the SRWC component 908 may be configured to establish, with the second device 950, a short-range wireless communications link that includes one an ACL link, an A2DP link, an eSCO link, an ISO link, a BLE link, or another type of short-range wireless communications link.

The apparatus 902 may be further configured with a second communications technology, in addition to short-range wireless communication. For example, the second communications technology may include Wi-Fi, Wi-Fi Direct, 5G NR, LTE, LTE-A, and/or another wireless/radio access technology. To coordinate the dual communications by the apparatus 902, the apparatus 902 may include a coexistence component 912. The coexistence component 912 may be configured to coordinate scheduling associated with the second communications technology with scheduling associated with the short-range wireless communications link. For example, the SRWC component 908 may inform the coexistence component 912 a number of ms (e.g., ten ms) before the SRWC component 908 is scheduled to transmit a packet so that communication associated with the second communications technology by the apparatus 902 does not interfere with the transmission of short-range wireless communications packets.

The apparatus 902 may further include an interval component 906. The interval component 906 may be configured to determine a time interval between each of a set of packets to be transmitted over the short-range wireless communications link to the second device 950. The time interval may be expressed as a number of slots or other time structure implemented by the short-range wireless communications link. In various aspects, the interval component 906 may be configured to determine the time interval based on one or more conditions associated with sending a set of packets over the short-range wireless communications link.

In one aspect, the interval component 906 may be configured to determine the time interval based on an application associated with the apparatus 902 (e.g., executed by the apparatus) that provides data to be sent over the short-range wireless communications link, such as when the application is associated with a relatively low latency and/or one or more QoS parameters.

In another aspect, the interval component 906 may be configured to determine the time interval based on a connection interval associated with the short-range wireless communications link. For example, the interval component 906 may be configured to determine the time interval based on a BLE connection interval and/or an HID connection interval.

In a third aspect, the interval component 906 may be configured to determine the time interval based on one or more channel conditions associated with the short-range wireless communications link. For example, the interval component 906 may be configured to determine the time interval based on one or more of an RSSI associated with the short-range wireless communications link, a channel quality report associated with the short-range wireless communications link received from the second device 950, a number of messages received from the second device 950 during a first time period indicating a retransmission request, and/or a number of retransmission packets transmitted to the second device 950 during a second time period.

In a fourth aspect, the interval component 906 may be configured to determine the time interval based on scheduling information associated with the second communications technology of the apparatus 902. For example, when the apparatus needs to schedule communication associated with the second communications technology, the coexistence component 912 may request that the interval component 906 increase the time interval between each of a set of packets to be transmitted over the short-range wireless communications link, e.g., so that the communication associated with the second communications technology may occur during the time interval when no packets are transmitted over the short-range wireless communications link.

The interval component 906 may be configured to adjust the time interval. For example, the interval component 906 may dynamically adjust the time interval as one or more conditions associated with transmission of a set of packets over the short-range wireless communications link change, e.g., without reestablishing the short-range wireless communications link.

The interval component 906 may be configured to inform the SRWC component 908 of the determined time interval. Responsively, the SRWC component 908 may be configured to schedule each of a set of packets in each of a set of slots that are separated by the time interval when transmitted by the transmission component 914 over the short-range wireless communications link.

Further based on the determined time interval, the SRWC component 908 may be configured to configure at least one type of scanning, such as page scanning and/or inquiry scanning. For example, the SRWC component 908 may configure scans (e.g., page scans and/or inquiry scans) to be disabled when the time interval becomes too large. In another example, the SRWC component 908 may configure the number, type, and/or periodicity of the scans based on the determined time interval, such as when the determined time interval is not so large as to merit disabling scans but may still be large enough that reconfiguring scans may reduce latency in packet transmission over the short-range wireless communications link (e.g., reducing the periodicity at which page scans and/or inquiry scans are performed may assist in reducing latency).

Additionally, the interval component 906 may be configured to determine a bitrate at which data is to be encoded and a packet size in which the encoded data is to be packetized based on the determined time interval. In some aspects, the bitrate may be based on the packet size (e.g., based on the payload size). According to various aspects, the interval component 906 may be configured to determine the packet size by selecting one type of packet from a plurality of different packet types compatible with the short-range wireless communications link. The interval component 906 may indicate the determined bitrate (and, potentially, packet size) to an encoder component 910 of the apparatus 902.

The encoder component 910 may be configured to encode data (e.g., provided by an application associated with the apparatus 902) according to the bitrate indicated by the interval component 906. For example, the encoder component 910 may generate codec frames including compressed data that approximately corresponds with the payload size of the packet type selected by the interval component 906.

The encoder component 910 may provide the encoded data (e.g., codec frames) to the SRWC component 908. The SRWC component 908 may packetize the encoded data in a set of packets, such as by inserting a respective codec frame into a respective payload of a respective packet. The SRWC component 908 may further populate one or more header fields of each of the packets.

In addition, the SRWC component 908 may determine a TTP associated with each of the packets. That is, the SRWC component 908 may determine an offset, referenced to a clock synchronized between the apparatus 902 and the second device 950, indicating a time at which respective encoded data included in a respective payload of a respective packet is to be output (e.g., played back) by the second device 950. The SRWC component 908 may determine each TTP based on the time interval, and the SRWC component 908 may include each TTP in a header field of a corresponding packet.

The SRWC component 908 may provide the packets to the transmission component 914 to be transmitted over the short-range wireless communications link to the second device 950. For example, the SRWC component 908 may schedule each of a set of packets in each of a set of slots that are separated by the determined time interval and, therefore, the transmission component 914 may transmit each of the set of packets in each of the corresponding set of slots so that each of the set of packets is separated by the determined time interval when transmitted over the short-range wireless communications link.

The apparatus may include additional components that perform each of the blocks/operations of the algorithm in the aforementioned method 800 of FIG. 8 and/or that perform each of the blocks/operations of the algorithm in the aforementioned call flow 660 of FIG. 6B. As such, each block/operation in the aforementioned method 800 of FIG. 8 and/or each of the blocks/operations of the algorithm in the aforementioned call flow 660 of FIG. 6B may be performed by a component and the apparatus 902 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
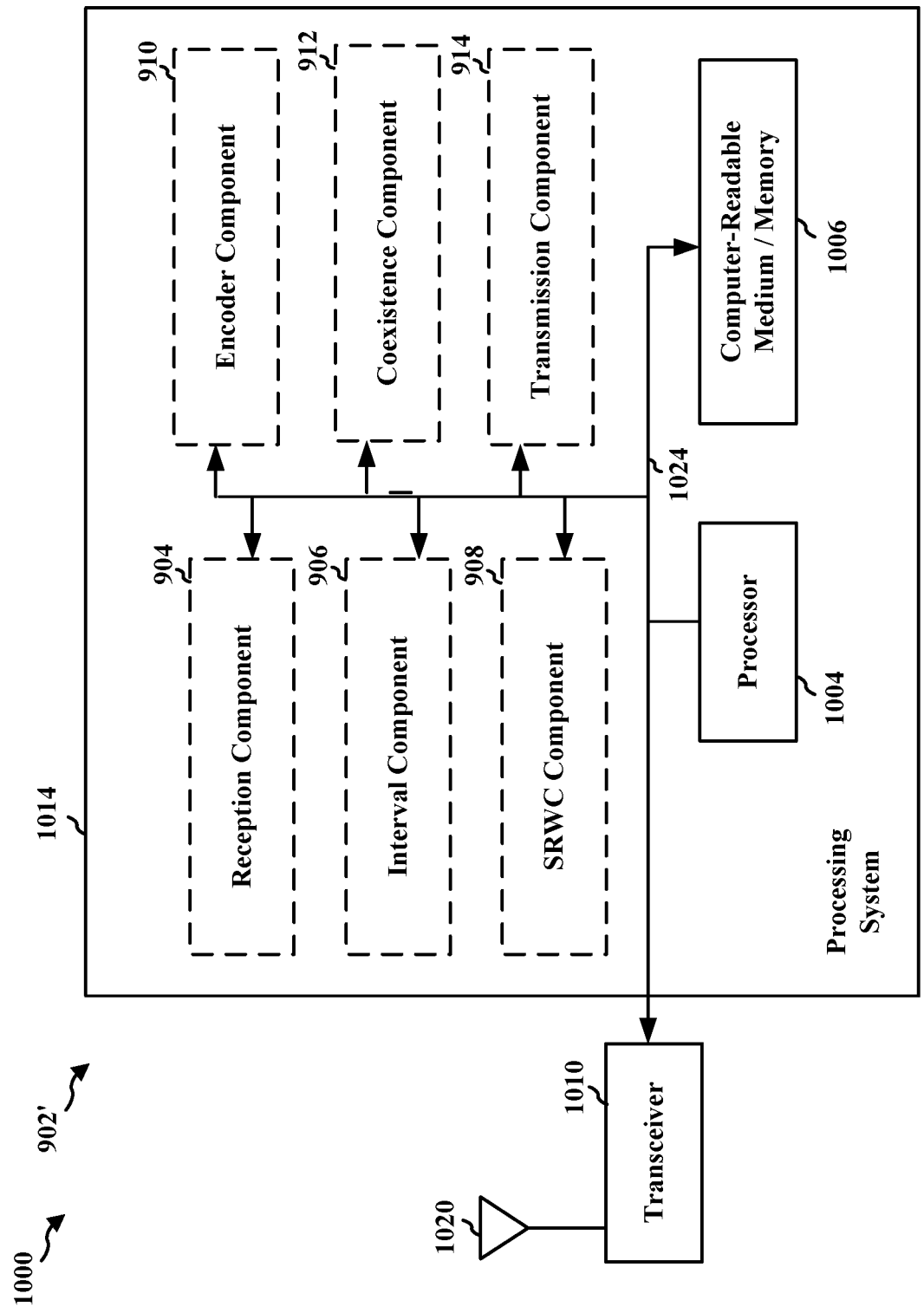
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 914, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912, 914. The components may be software components running in the processor 1004, resident/stored in the computer readable medium/memory 1006, one or more hardware components coupled to the processor 1004, or some combination thereof.

In one configuration, the apparatus 902/902' for wireless communication may include means for determining a time interval between each of a set of packets to be transmitted over a short-range wireless communications link with a second device. The apparatus 902/902' may include means for encoding data with a bitrate that is based on the time interval. The apparatus 902/902' may include means for packetizing the encoded data in the set of packets. The apparatus 902/902' may include means for transmitting the set of packets to the second device over the short-range wireless communications link, each of the set of packets being separated by the time interval when transmitted.

In one aspect, the time interval is based on scheduling information associated with a second communications technology of the apparatus 902/902'. In one aspect, scheduling associated with the second communications technology of the apparatus 902/902' is based on the time interval. In one aspect, the encoding the data with the bitrate is further based on a size of each of the set of packets. The apparatus 902/902' may further include means for adjusting a communication window associated with the second communications technology based on the time interval, and means for transmitting one or more packets associated with the second communications technology in the communication window.

The apparatus 902/902' may further include means for determining a channel condition associated with the short-range wireless communications link with the second device, wherein the time interval is determined based on the channel condition. In one aspect, the channel condition is based on one or more of an RSSI, a channel quality report received from the second device, a number of messages indicating a retransmission request received from the second device, or a number of retransmission packets transmitted to the second device. In one aspect, the time interval is determined based on an application associated with the data.

The apparatus 902/902' may further include means for determining, based on the time interval, a respective TTP associated with each encoded data packetized in each of the set of packets, wherein each of the set of packets includes the respective TTP. In one aspect, the apparatus 902/902' may include means for disabling at least one type of scanning based on the time interval. In one aspect, the means for determining the time interval may be configured to adjust the time interval between each of the set of packets to be transmitted over the short-range wireless communications link. In one aspect, the short-range wireless communications link comprises an A2DP link or a BLE link.

The aforementioned means may be one or more of the aforementioned processor(s) 202, short-range communications controller 252, WLAN controller 250, and/or radio 230 in FIG. 2, components of the apparatus 902, and/or the processing system 1014 of the apparatus 902' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications by a first device, the method comprising:
   determining a time interval between each of a set of packets to be transmitted over a short-range wireless communications link with a second device;
   encoding data with a bitrate that is based on the time interval;
   packetizing the encoded data in the set of packets;
   transmitting the set of packets to the second device over the short-range wireless communications link, each of the set of packets being separated by the time interval when transmitted; and
   determining, based on the time interval, a respective time to play (TTP) associated with each encoded data packetized in each of the set of packets, wherein each of the set of packets includes the respective TTP.

2. The method of claim 1, wherein the time interval is based on scheduling information associated with a second communications technology of the first device.

3. The method of claim 2, wherein scheduling associated with the second communications technology of the first device is based on the time interval.

4. The method of claim 3, further comprising:
   adjusting a communication window associated with the second communications technology based on the time interval; and
   transmitting one or more packets associated with the second communications technology in the communication window.

5. The method of claim 1, wherein the encoding the data with the bitrate is further based on a size of each of the set of packets.

6. The method of claim 1, further comprising:
   determining a channel condition associated with the short-range wireless communications link with the second device,
   wherein the time interval is determined based on the channel condition.

7. The method of claim 6, wherein the channel condition is based on one or more of an reference signal strength indicator (RSSI), a channel quality report received from the second device, a number of messages indicating a retransmission request received from the second device, or a number of retransmission packets transmitted to the second device.

8. The method of claim 1, wherein the time interval is determined based on an application associated with the data.

9. The method of claim 1, further comprising:
configuring at least one type of scanning based on the time interval.

10. The method of claim 1, further comprising:
adjusting the time interval between each of the set of packets to be transmitted over the short-range wireless communications link.

11. The method of claim 1, wherein the short-range wireless communications link comprises an advanced audio distribution profile (A2DP) link or a Bluetooth Low Energy (BLE) link.

12. An apparatus for wireless communication, the apparatus comprising:
a memory; and
at least one processor coupled to the memory and configured to:
determine a time interval between each of a set of packets to be transmitted over a short-range wireless communications link with a second device;
encode data with a bitrate that is based on the time interval;
packetize the encoded data in the set of packets;
transmit the set of packets to the second device over the short-range wireless communications link, each of the set of packets being separated by the time interval when transmitted; and
determine, based on the time interval, a respective time to play (TTP) associated with each encoded data packetized in each of the set of packets, wherein each of the set of packets includes the respective TTP.

13. The apparatus of claim 12, wherein the time interval is based on scheduling information associated with a second communications technology of the apparatus.

14. The apparatus of claim 13, wherein scheduling associated with the second communications technology of the apparatus is based on the time interval.

15. The apparatus of claim 14, wherein the at least one processor is further configured to:
adjust a communication window associated with the second communications technology based on the time interval; and
transmit one or more packets associated with the second communications technology in the communication window.

16. The apparatus of claim 12, wherein the at least one processor is configured to encode the data with the bitrate further based on a size of each of the set of packets.

17. The apparatus of claim 12, wherein the at least one processor is further configured to:
determine a channel condition associated with the short-range wireless communications link with the second device,
wherein the time interval is determined based on the channel condition.

18. The apparatus of claim 17, wherein the channel condition is based on one or more of an reference signal strength indicator (RSSI), a channel quality report received from the second device, a number of messages indicating a retransmission request received from the second device, or a number of retransmission packets transmitted to the second device.

19. The apparatus of claim 12, wherein the time interval is determined based on an application associated with the data.

20. The apparatus of claim 12, wherein the at least one processor is further configured to:
configure at least one type of scanning based on the time interval.

21. The apparatus of claim 12, wherein the at least one processor is further configured to:
adjust the time interval between each of the set of packets to be transmitted over the short-range wireless communications link.

22. The apparatus of claim 12, wherein the short-range wireless communications link comprises an advanced audio distribution profile (A2DP) link or a Bluetooth Low Energy (BLE) link.

23. An apparatus for wireless communication, the apparatus comprising:
means for determining a time interval between each of a set of packets to be transmitted over a short-range wireless communications link with a second device;
means for encoding data with a bitrate that is based on the time interval;
means for packetizing the encoded data in the set of packets;
means for transmitting the set of packets to the second device over the short-range wireless communications link, each of the set of packets being separated by the time interval when transmitted; and
means for determining, based on the time interval, a respective time to play (TTP) associated with each encoded data packetized in each of the set of packets, wherein each of the set of packets includes the respective TTP.

24. The apparatus of claim 23, wherein the time interval is based on scheduling information associated with a second communications technology of the apparatus.

25. The apparatus of claim 24, wherein scheduling associated with the second communications technology of the apparatus is based on the time interval.

26. The apparatus of claim 23, further comprising:
means for adjusting a communication window associated with the second communications technology based on the time interval; and
means for transmitting one or more packets associated with the second communications technology in the communication window.

27. The apparatus of claim 23, wherein the encoding the data with the bitrate is further based on a size of each of the set of packets.

28. The apparatus of claim 23, further comprising:
means for determining a channel condition associated with the short-range wireless communications link with the second device,
wherein the time interval is determined based on the channel condition.

29. The apparatus of claim 28, wherein the channel condition is based on one or more of an reference signal strength indicator (RSSI), a channel quality report received from the second device, a number of messages indicating a retransmission request received from the second device, or a number of retransmission packets transmitted to the second device.

30. The apparatus of claim 23, wherein the time interval is determined based on an application associated with the data.

31. The apparatus of claim 23, further comprising:
means for configuring at least one type of scanning based on the time interval.

32. The apparatus of claim 23, wherein the means for determining the time interval is configured to adjust the time interval between each of the set of packets to be transmitted over the short-range wireless communications link.

33. The apparatus of claim 23, wherein the short-range wireless communications link comprises an advanced audio distribution profile (A2DP) link or a Bluetooth Low Energy (BLE) link.

34. A computer-readable medium storing computer-executable code for wireless communication by a first device, comprising code to:
determine a time interval between each of a set of packets to be transmitted over a short-range wireless communications link with a second device;
encode data with a bitrate that is based on the time interval;
packetize the encoded data in the set of packets;
transmit the set of packets to the second device over the short-range wireless communications link, each of the set of packets being separated by the time interval when transmitted; and
determine, based on the time interval, a respective time to play (TTP) associated with each encoded data packetized in each of the set of packets, wherein each of the set of packets includes the respective TTP.

* * * * *